United States Patent
Sun et al.

(10) Patent No.: US 10,757,706 B2
(45) Date of Patent: Aug. 25, 2020

(54) TECHNIQUES AND APPARATUSES FOR USING A DOWNLINK ASSIGNMENT INDEX IN NEW RADIO

(71) Applicant: QUALCOMM Incorporated, San Diego, CA (US)

(72) Inventors: Jing Sun, San Diego, CA (US); Peter Pui Lok Ang, San Diego, CA (US); Yang Yang, San Diego, CA (US); Yi Huang, San Diego, CA (US); Joseph Binamira Soriaga, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/190,762

(22) Filed: Nov. 14, 2018

(65) Prior Publication Data
US 2019/0159206 A1 May 23, 2019

Related U.S. Application Data

(60) Provisional application No. 62/590,057, filed on Nov. 22, 2017.

(51) Int. Cl.
*H04W 72/04* (2009.01)
*H04L 5/00* (2006.01)
*H04L 1/18* (2006.01)
*H04L 1/16* (2006.01)
*H04W 72/14* (2009.01)

(52) U.S. Cl.
CPC ....... *H04W 72/0453* (2013.01); *H04L 1/1664* (2013.01); *H04L 1/1861* (2013.01);
(Continued)

(58) Field of Classification Search
CPC ......... H04W 72/0453; H04W 72/0413; H04W 72/042; H04W 72/048; H04W 72/14;
(Continued)

(56) References Cited

U.S. PATENT DOCUMENTS

2011/0128922 A1* 6/2011 Chen .................. H04L 5/0007
370/329
2015/0131494 A1* 5/2015 He ...................... H04B 7/0469
370/280
(Continued)

FOREIGN PATENT DOCUMENTS

EP        2204937 A1      7/2010
WO   WO-2010049584 A1 *  5/2010  ........... H01L 1/1607

OTHER PUBLICATIONS

Ericsson: "On HARQ Management", 3GPP TSG RAN1 WG1 Meeting #90bis, 3GPP Draft; R1-1718645, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 3, 2017 (Oct. 3, 2017), 10 Pages, XP051353176, Retrieved from the Internet: URL: http://www.3gpp.org/ftp/tsg_ran/WG1_RL1/TSGR1_90b/Docs/ [retrieved on Oct. 3, 2017] section 3.1.4, fourth paragraph.

(Continued)

*Primary Examiner* — Obaidul Huq
(74) *Attorney, Agent, or Firm* — Harrity & Harrity, LLP

(57) ABSTRACT

Various aspects of the present disclosure generally relate to wireless communication. In some aspects, a user equipment (UE) may receive an uplink grant that includes multiple total downlink assignment indexes (DAIs) corresponding to multiple DAI groups associated with the UE, wherein each of the multiple DAI groups is associated with a different set of component carriers used by the UE for carrier aggregation; and transmit (ACK/NACK) feedback for the multiple DAI groups based at least in part on the multiple total DAIs included in the uplink grant. In some aspects, a base station may determine multiple total DAIs corresponding to multiple DAI groups associated with a UE, wherein each of the multiple DAI groups is associated with a different set of
(Continued)

component carriers used by the UE for carrier aggregation; and transmit the multiple total DAIs to the UE in an uplink grant. Numerous other aspects are provided.

26 Claims, 13 Drawing Sheets

(52) U.S. Cl.
CPC ............ *H04L 1/1896* (2013.01); *H04L 5/001* (2013.01); *H04L 5/0053* (2013.01); *H04L 5/0055* (2013.01); *H04L 5/0094* (2013.01); *H04W 72/042* (2013.01); *H04W 72/048* (2013.01); *H04W 72/0413* (2013.01); *H04W 72/14* (2013.01)

(58) Field of Classification Search
CPC ... H04L 1/1664; H04L 1/1861; H04L 1/1896; H04L 5/001; H04L 5/0053; H04L 5/0055; H04L 5/0094
USPC .......................................... 370/310, 328, 329
See application file for complete search history.

(56) References Cited

U.S. PATENT DOCUMENTS

2019/0007943 A1* 1/2019 Takeda .................. H04L 1/1861
2019/0045489 A1* 2/2019 He ....................... H04W 72/042
2019/0149271 A1* 5/2019 Yin ....................... H04L 1/1816
370/329

OTHER PUBLICATIONS

Intel Corporation: "On Remaining Aspects of CBG-Based (Re)Transmission", 3GPP TSG-RAN WG1 #91, 3GPP Draft; R1-1720096, 3rd Generation Partnership Project (3GPP), Mobile Competence Centre; 650, Route Des Lucioles; F-06921 Sophia-Antipolis Cedex; France, vol. RAN WG1, No. Reno, Nevada, USA; Nov. 27, 2017-Dec. 1, 2017, Nov. 18, 2017 (Nov. 18, 2017), pp. 1-4, XP051369777, Retrieved from the Internet: URL: http://www.3gpp.org/ftp/tsg%5Fran/WG1%5FRL1/TSGR1%5F91|Docs/ [retrieved on Nov. 18, 2017] p. 3, lines 4-40.
International Search Report and Written Opinion—PCT/US2018/061244—ISA/EPO—dated Feb. 4, 2019.
Vivo: "On UCI Multiplexing", 3GPP TSG RAN WG1 Meeting #91, 3GPP Draft; R1-1719791 on UCI Multiplexing_Final, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 18, 2017 (Nov. 18, 2017), 3 Pages, XP051369534, Retrieved from the Internet: URL: http://www.3gpp.org/ftp/tsg%5Fran/WG1%5FRL1/TSGR1%5F91|Docs/ [retrieved on Nov. 18, 2017] section 2.3, figure 3.

* cited by examiner

TECHNIQUES AND APPARATUSES FOR USING A DOWNLINK ASSIGNMENT INDEX IN NEW RADIO

CROSS-REFERENCE TO RELATED APPLICATIONS UNDER 35 U.S.C. § 119

This application claims priority to U.S. Provisional Patent Application No. 62/590,057, filed on Nov. 22, 2017, entitled "TECHNIQUES AND APPARATUSES FOR USING A DOWNLINK ASSIGNMENT INDEX IN NEW RADIO," which is hereby expressly incorporated by reference herein.

FIELD OF THE DISCLOSURE

Aspects of the present disclosure generally relate to wireless communication, and more particularly to techniques and apparatuses for using a downlink assignment index (DAI) in New Radio.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may be performed by a base station. The method may include determining a total DAI for a bundling window, wherein the total DAI indicates a number of downlink grants transmitted to a UE in the bundling window; and transmitting the total DAI to the UE in downlink control information (DCI) other than a downlink grant.

In some aspects, a method of wireless communication may be performed by a UE. The method may include monitoring a slot for a total DAI in DCI other than a downlink grant, wherein the total DAI indicates a number of downlink grants transmitted to the UE in a bundling window; determining whether the total DAI has been received by the UE; and selectively transmitting acknowledgement (ACK) or negative acknowledgement (NACK) (ACK/NACK) feedback for the bundling window based at least in part on whether the total DAI has been received.

In some aspects, a method of wireless communication may be performed by a base station. The method may include determining whether a downlink assignment is to be scheduled for a UE in a final slot of a bundling window; determining a total DAI for the bundling window based at least in part on whether the downlink assignment is to be scheduled, wherein the total DAI indicates a number of downlink grants transmitted to the UE in the bundling window; and transmitting the total DAI in the final slot of the bundling window regardless of whether the downlink assignment is to be scheduled in the final slot of the bundling window.

In some aspects, a method of wireless communication may be performed by a UE. The method may include monitoring a final slot of a bundling window for a total DAI, wherein the total DAI indicates a number of downlink grants transmitted to the UE in the bundling window; determining whether the total DAI has been received by the UE in the final slot of the bundling window; and selectively transmitting ACK/NACK feedback for the bundling window based at least in part on whether the total DAI has been received in the final slot of the bundling window.

In some aspects, a method of wireless communication may be performed by a base station. The method may include determining multiple total DAIs for a bundling window based at least in part on a number of downlink grants transmitted to each of multiple UEs in the bundling window; and transmitting the multiple total DAIs in a common downlink control communication associated with the multiple UEs.

In some aspects, a method of wireless communication may be performed by a UE. The method may include receiving a common downlink control communication, associated with multiple UEs, that includes multiple total DAIs that indicate a number of downlink grants transmitted to each of the multiple UEs in a bundling window; identifying, from the common downlink control communication, a total DAI, of the multiple total DAIs, that corresponds to the UE;

and transmitting ACK/NACK feedback for the bundling window based at least in part on the total DAI.

In some aspects, a method of wireless communication may be performed by a base station. The method may include determining multiple total DAIs corresponding to multiple DAI groups associated with a UE, wherein each of the multiple DAI groups is associated with a different set of component carriers used by the UE for carrier aggregation; and transmitting the multiple total DAIs to the UE in an uplink grant.

In some aspects, a method of wireless communication may be performed by a UE. The method may include receiving an uplink grant that includes multiple total DAIs corresponding to multiple DAI groups associated with the UE, wherein each of the multiple DAI groups is associated with a different set of component carriers used by the UE for carrier aggregation; and transmitting ACK/NACK feedback for the multiple DAI groups based at least in part on the multiple total DAIs included in the uplink grant.

In some aspects, a base station for wireless communication may include memory and one or more processors operatively coupled to the memory. The memory and the one or more processors may be configured to determine a total DAI for a bundling window, wherein the total DAI indicates a number of downlink grants transmitted to a UE in the bundling window; and transmit the total DAI to the UE in DCI other than a downlink grant.

In some aspects, a UE for wireless communication may include memory and one or more processors operatively coupled to the memory. The memory and the one or more processors may be configured to monitor a slot for a total DAI in DCI other than a downlink grant, wherein the total DAI indicates a number of downlink grants transmitted to the UE in a bundling window; determine whether the total DAI has been received by the UE; and selectively transmit acknowledgement ACK/NACK feedback for the bundling window based at least in part on whether the total DAI has been received.

In some aspects, a base station for wireless communication may include memory and one or more processors operatively coupled to the memory. The memory and the one or more processors may be configured to determine whether a downlink assignment is to be scheduled for a UE in a final slot of a bundling window; determine a total DAI for the bundling window based at least in part on whether the downlink assignment is to be scheduled, wherein the total DAI indicates a number of downlink grants transmitted to the UE in the bundling window; and transmit the total DAI in the final slot of the bundling window regardless of whether the downlink assignment is to be scheduled in the final slot of the bundling window.

In some aspects, a UE for wireless communication may include memory and one or more processors operatively coupled to the memory. The memory and the one or more processors may be configured to monitor a final slot of a bundling window for a total DAI, wherein the total DAI indicates a number of downlink grants transmitted to the UE in the bundling window; determine whether the total DAI has been received by the UE in the final slot of the bundling window; and selectively transmit ACK/NACK feedback for the bundling window based at least in part on whether the total DAI has been received in the final slot of the bundling window.

In some aspects, a base station for wireless communication may include memory and one or more processors operatively coupled to the memory. The memory and the one or more processors may be configured to determine multiple total DAIs for a bundling window based at least in part on a number of downlink grants transmitted to each of multiple UEs in the bundling window; and transmit the multiple total DAIs in a common downlink control communication associated with the multiple UEs.

In some aspects, a UE for wireless communication may include memory and one or more processors operatively coupled to the memory. The memory and the one or more processors may be configured to receive a common downlink control communication, associated with multiple UEs, that includes multiple total DAIs that indicate a number of downlink grants transmitted to each of the multiple UEs in a bundling window; identify, from the common downlink control communication, a total DAI, of the multiple total DAIs, that corresponds to the UE; and transmit ACK/NACK feedback for the bundling window based at least in part on the total DAI.

In some aspects, a base station for wireless communication may include memory and one or more processors operatively coupled to the memory. The memory and the one or more processors may be configured to determine multiple total DAIs corresponding to multiple DAI groups associated with a UE, wherein each of the multiple DAI groups is associated with a different set of component carriers used by the UE for carrier aggregation; and transmit the multiple total DAIs to the UE in an uplink grant.

In some aspects, a UE for wireless communication may include memory and one or more processors operatively coupled to the memory. The memory and the one or more processors may be configured to receive an uplink grant that includes multiple total DAIs corresponding to multiple DAI groups associated with the UE, wherein each of the multiple DAI groups is associated with a different set of component carriers used by the UE for carrier aggregation; and transmit ACK/NACK feedback for the multiple DAI groups based at least in part on the multiple total DAIs included in the uplink grant.

In some aspects, a non-transitory computer-readable medium may store one or more instructions for wireless communication. The one or more instructions, when executed by one or more processors of a base station, may cause the one or more processors to determine a total DAI for a bundling window, wherein the total DAI indicates a number of downlink grants transmitted to a UE in the bundling window; and transmit the total DAI to the UE in DCI other than a downlink grant.

In some aspects, a non-transitory computer-readable medium may store one or more instructions for wireless communication. The one or more instructions, when executed by one or more processors of a UE, may cause the one or more processors to monitor a slot for a total DAI in DCI other than a downlink grant, wherein the total DAI indicates a number of downlink grants transmitted to the UE in a bundling window; determine whether the total DAI has been received by the UE; and selectively transmit acknowledgement ACK/NACK feedback for the bundling window based at least in part on whether the total DAI has been received.

In some aspects, a non-transitory computer-readable medium may store one or more instructions for wireless communication. The one or more instructions, when executed by one or more processors of a base station, may cause the one or more processors to determine whether a downlink assignment is to be scheduled for a UE in a final slot of a bundling window; determine a total DAI for the bundling window based at least in part on whether the downlink assignment is to be scheduled, wherein the total DAI indicates a number of downlink grants transmitted to the UE in the bundling window; and transmit the total DAI in the final slot of the bundling window regardless of whether the downlink assignment is to be scheduled in the final slot of the bundling window.

In some aspects, a non-transitory computer-readable medium may store one or more instructions for wireless communication. The one or more instructions, when executed by one or more processors of a UE, may cause the one or more processors to monitor a final slot of a bundling window for a total DAI, wherein the total DAI indicates a number of downlink grants transmitted to the UE in the bundling window; determine whether the total DAI has been received by the UE in the final slot of the bundling window; and selectively transmit ACK/NACK feedback for the bundling window based at least in part on whether the total DAI has been received in the final slot of the bundling window.

In some aspects, a non-transitory computer-readable medium may store one or more instructions for wireless communication. The one or more instructions, when executed by one or more processors of a base station, may cause the one or more processors to determine multiple total DAIs for a bundling window based at least in part on a number of downlink grants transmitted to each of multiple UEs in the bundling window; and transmit the multiple total DAIs in a common downlink control communication associated with the multiple UEs.

In some aspects, a non-transitory computer-readable medium may store one or more instructions for wireless communication. The one or more instructions, when executed by one or more processors of a UE, may cause the one or more processors to receive a common downlink control communication, associated with multiple UEs, that includes multiple total DAIs that indicate a number of downlink grants transmitted to each of the multiple UEs in a bundling window; identify, from the common downlink control communication, a total DAI, of the multiple total DAIs, that corresponds to the UE; and transmit ACK/NACK feedback for the bundling window based at least in part on the total DAI.

In some aspects, a non-transitory computer-readable medium may store one or more instructions for wireless communication. The one or more instructions, when executed by one or more processors of a base station, may cause the one or more processors to determine multiple total DAIs corresponding to multiple DAI groups associated with a UE, wherein each of the multiple DAI groups is associated with a different set of component carriers used by the UE for carrier aggregation; and transmit the multiple total DAIs to the UE in an uplink grant.

In some aspects, a non-transitory computer-readable medium may store one or more instructions for wireless communication. The one or more instructions, when executed by one or more processors of a UE, may cause the one or more processors to receive an uplink grant that includes multiple total DAIs corresponding to multiple DAI groups associated with the UE, wherein each of the multiple DAI groups is associated with a different set of component carriers used by the UE for carrier aggregation; and transmit ACK/NACK feedback for the multiple DAI groups based at least in part on the multiple total DAIs included in the uplink grant.

In some aspects, an apparatus for wireless communication may include means for determining a total DAI for a bundling window, wherein the total DAI indicates a number of downlink grants transmitted to a UE in the bundling window; and means for transmitting the total DAI to the UE in DCI other than a downlink grant.

In some aspects, an apparatus for wireless communication may include means for monitoring a slot for a total DAI in DCI other than a downlink grant, wherein the total DAI indicates a number of downlink grants transmitted to the apparatus in a bundling window; means for determining whether the total DAI has been received by the apparatus; and means for selectively transmitting ACK/NACK feedback for the bundling window based at least in part on whether the total DAI has been received.

In some aspects, an apparatus for wireless communication may include means for determining whether a downlink assignment is to be scheduled for a UE in a final slot of a bundling window; means for determining a total DAI for the bundling window based at least in part on whether the downlink assignment is to be scheduled, wherein the total DAI indicates a number of downlink grants transmitted to the UE in the bundling window; and means for transmitting the total DAI in the final slot of the bundling window regardless of whether the downlink assignment is to be scheduled in the final slot of the bundling window.

In some aspects, an apparatus for wireless communication may include means for monitoring a final slot of a bundling window for a total DAI, wherein the total DAI indicates a number of downlink grants transmitted to the apparatus in the bundling window; means for determining whether the total DAI has been received by the apparatus in the final slot of the bundling window; and means for selectively transmitting ACK/NACK feedback for the bundling window based at least in part on whether the total DAI has been received in the final slot of the bundling window.

In some aspects, an apparatus for wireless communication may include means for determining multiple total DAIs for a bundling window based at least in part on a number of downlink grants transmitted to each of multiple UEs in the bundling window; and means for transmitting the multiple total DAIs in a common downlink control communication associated with the multiple UEs.

In some aspects, an apparatus for wireless communication may include means for receiving a common downlink control communication, associated with multiple UEs, that includes multiple total DAIs that indicate a number of downlink grants transmitted to each of the multiple UEs in a bundling window; means for identifying, from the common downlink control communication, a total DAI, of the multiple total DAIs, that corresponds to the apparatus; and means for transmitting ACK/NACK feedback for the bundling window based at least in part on the total DAI.

In some aspects, an apparatus for wireless communication may include means for determining multiple total DAIs corresponding to multiple DAI groups associated with a UE, wherein each of the multiple DAI groups is associated with a different set of component carriers used by the UE for carrier aggregation; and means for transmitting the multiple total DAIs to the UE in an uplink grant.

In some aspects, an apparatus for wireless communication may include means for receiving an uplink grant that includes multiple total DAIs corresponding to multiple DAI groups associated with the apparatus, wherein each of the multiple DAI groups is associated with a different set of component carriers used by the apparatus for carrier aggregation; and means for transmitting ACK/NACK feedback for the multiple DAI groups based at least in part on the multiple total DAIs included in the uplink grant.

Aspects generally include a method, device, apparatus, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
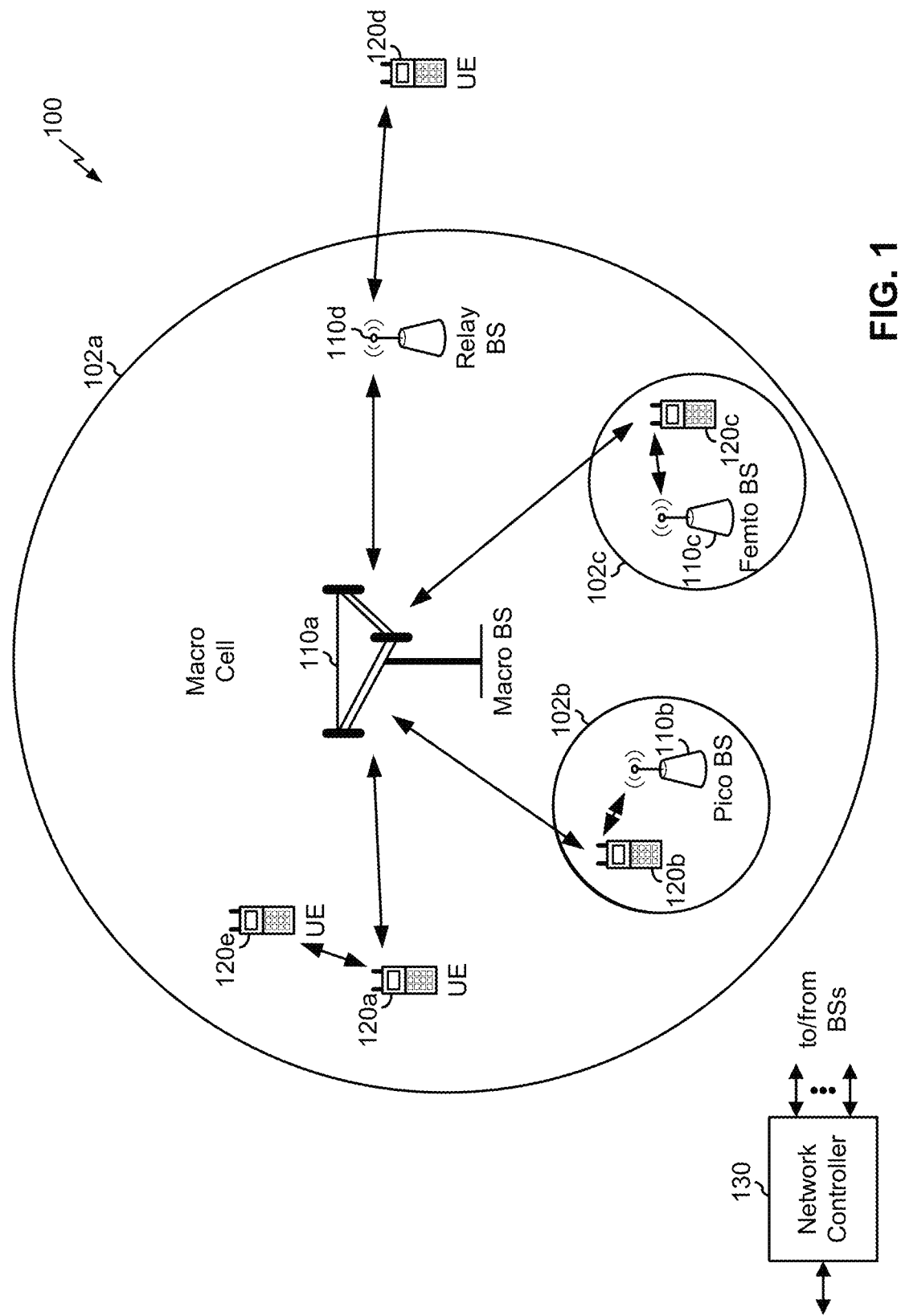
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 1 is provided merely as an example. Other examples are possible and may differ from what was described with regard to FIG. 1.

Figure 2:
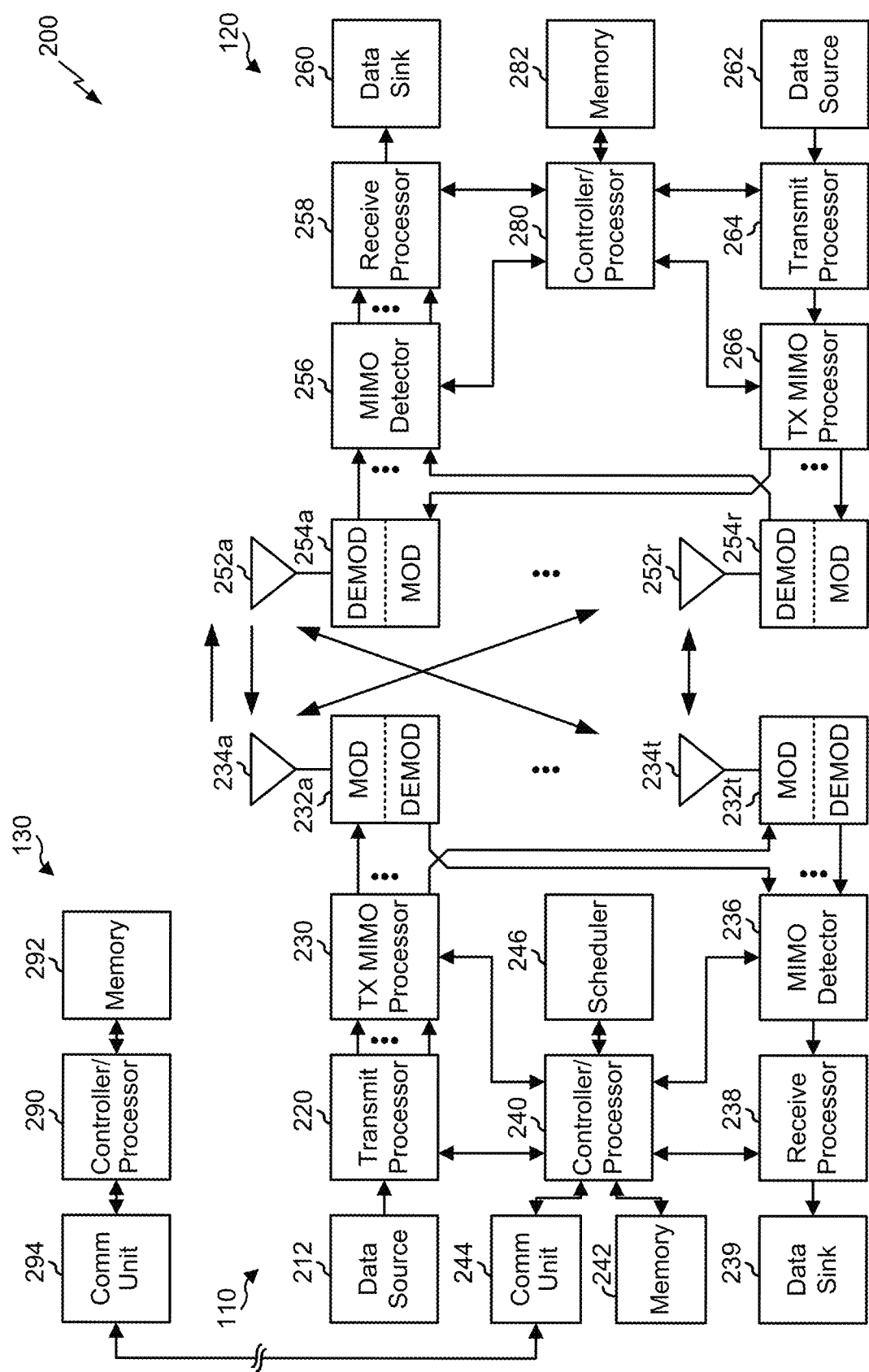
FIG. 2 is a block diagram conceptually illustrating an example of a base station in communication with a user equipment (UE) in a wireless communication network, in accordance with various aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with using a downlink assignment index (DAI) in New Radio, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include means for monitoring a slot for a total DAI in DCI other than a downlink grant, wherein the total DAI indicates a number of downlink grants transmitted to the UE 120 in a bundling window; means for determining whether the total DAI has been received by the UE 120; means for selectively transmitting ACK/NACK feedback for the bundling window based at least in part on whether the total DAI has been received; and/or the like. Additionally, or alternatively, the UE 120 may include means for monitoring a final slot of a bundling window for a total DAI, wherein the total DAI indicates a number of downlink grants transmitted to the UE 120 in the bundling window; means for determining whether the total DAI has been received by the UE 120 in the final slot of the bundling window; means for selectively transmitting ACK/NACK feedback for the bundling window based at least in part on whether the total DAI has been received in the final slot of the bundling window; and/or the like. In some aspects, such means may include one or more components of UE 120 described in connection with FIG. 2.

Additionally, or alternatively, the UE 120 may include means for receiving a common downlink control communication, associated with multiple UEs, that includes multiple total DAIs that indicate a number of downlink grants transmitted to each of the multiple UEs in a bundling window; means for identifying, from the common downlink control communication, a total DAI, of the multiple total DAIs, that corresponds to the UE 120; means for transmitting ACK/NACK feedback for the bundling window based at least in part on the total DAI; and/or the like. Additionally, or alternatively, the UE 120 may include means for receiving an uplink grant that includes multiple total DAIs corresponding to multiple DAI groups associated with the UE 120, wherein each of the multiple DAI groups is associated with a different set of component carriers used by the UE 120 for carrier aggregation; means for transmitting ACK/NACK feedback for the multiple DAI groups based at least in part on the multiple total DAIs included in the uplink grant; and/or the like. In some aspects, such means may include one or more components of UE 120 described in connection with FIG. 2.

In some aspects, the base station 110 may include means for determining a total DAI for a bundling window, wherein the total DAI indicates a number of downlink grants transmitted to a UE in the bundling window; means for transmitting the total DAI to the UE in DCI other than a downlink grant; and/or the like. Additionally, or alternatively, the base station 110 may include means for determining whether a downlink assignment is to be scheduled for a UE in a final slot of a bundling window; means for determining a total DAI for the bundling window based at least in part on whether the downlink assignment is to be scheduled, wherein the total DAI indicates a number of downlink grants transmitted to the UE in the bundling window; means for transmitting the total DAI in the final slot of the bundling window regardless of whether the downlink assignment is to be scheduled in the final slot of the bundling window; and/or the like. In some aspects, such means may include one or more components of base station 110 described in connection with FIG. 2.

Additionally, or alternatively, the base station 110 may include means for determining multiple total DAIs for a bundling window based at least in part on a number of downlink grants transmitted to each of multiple UEs in the bundling window; means for transmitting the multiple total DAIs in a common downlink control communication associated with the multiple UEs; and/or the like. Additionally, or alternatively, the base station 110 may include means for determining multiple total DAIs corresponding to multiple DAI groups associated with a UE, wherein each of the multiple DAI groups is associated with a different set of component carriers used by the UE for carrier aggregation; means for transmitting the multiple total DAIs to the UE in an uplink grant; and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3:
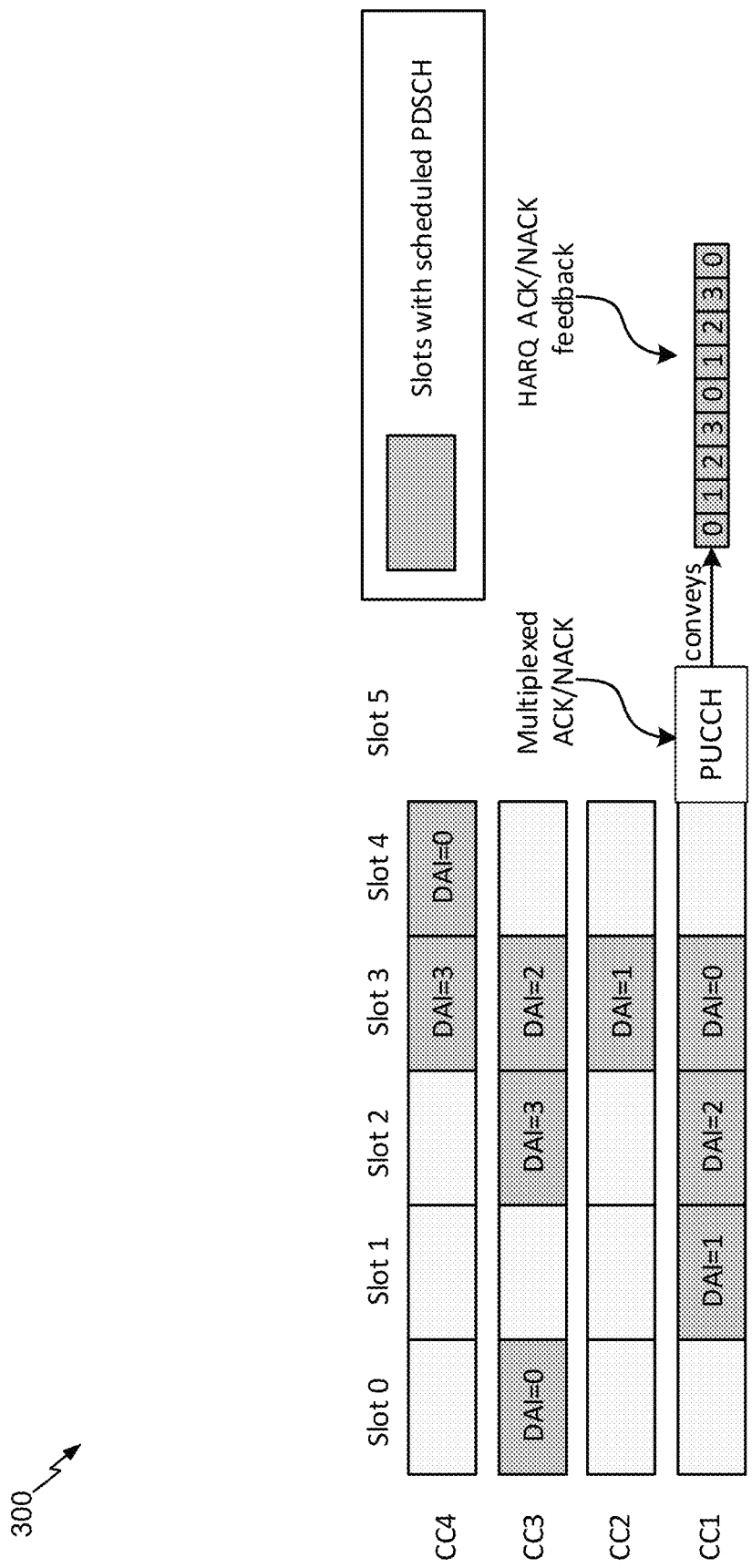
FIGS. 3 and 4 are diagrams illustrating examples of using downlink assignment indexes for hybrid automatic repeat request acknowledgement or negative acknowledgement (HARQ ACK/NACK) feedback, in accordance with various aspects of the present disclosure.

FIG. 3 is a diagram illustrating an example 300 of using downlink assignment indexes for HARQ ACK/NACK feedback, in accordance with various aspects of the present disclosure.

In LTE, a downlink assignment index (DAI) was introduced to solve the many-to-one mapping problem of HARQ ACK/NACK feedback. DAI is designed to alleviate the ambiguity between the base station 110 and the UE 120 regarding the total size and index of scheduled transport blocks (TBs) to be acknowledged or negatively acknowledged in a single PUCCH transmission (e.g., in multiplexed or bundled HARQ ACK/NACK feedback). Two DCI fields were introduced: a DAI counter (sometimes referred to as cumulative DAI) and a total DAI value, each with two bits. As illustrated in FIG. 3, the DAI counter accumulates in a frequency first (e.g., across slots) and time second (e.g., across component carriers (CCs)) fashion, taking a value of 0, 1, 2, or 3, corresponding to the two bits of the DAI counter. When the UE 120 misses a value in an observed DAI sequence, then the UE 120 determines that a downlink grant was missed and reports a NACK in the HARQ ACK/NACK feedback transmitted via the physical uplink control channel (PUCCH). With a 2-bit modulo-4 DAI counter, this DAI mechanism is robust to any consecutive three missing grants, and with a 2-bit total DAI field, the issue of PUCCH payload size ambiguity caused by missing the last few grants may be alleviated.

However, this DAI mechanism may result in ambiguities between the base station 110 and the UE 120 regarding a size of the HARQ ACK/NACK feedback when the UE 120 misses the last downlink grant in a bundling window that includes multiple downlink grants for which HARQ ACK/NACK feedback is reported together, as described in more detail below in connection with FIG. 5. In this case, the UE 120 may transmit a different number of HARQ ACK/NACK bits than are expected by the base station 110, resulting in an error. Furthermore, NR presents other challenges in the design of a robust HARQ ACK/NACK feedback mechanism, one of them being that the number of code block groups (CBGs) per TB for different downlink assignments could be different, leading to potentially different ACK/NACK payload sizes across slots and/or CCs. In this case, multiple DAI counters may be used for different DAI groups, adding further complexity to the HARQ ACK/NACK process and an increased likelihood of ambiguities between the base station 110 and the UE 120 regarding a size of HARQ ACK/NACK feedback for different DAI groups. Some techniques and apparatuses described herein reduce or eliminate ambiguities between the base station 110 and the UE 120 regarding HARQ ACK/NACK feedback when the UE 120 misses the last downlink grant in a bundling window, when the UE 120 is associated with multiple DAI groups, and/or the like.

As indicated above, FIG. 3 is provided as an example. Other examples are possible and may differ from what was described with respect to FIG. 3.

Figure 4:
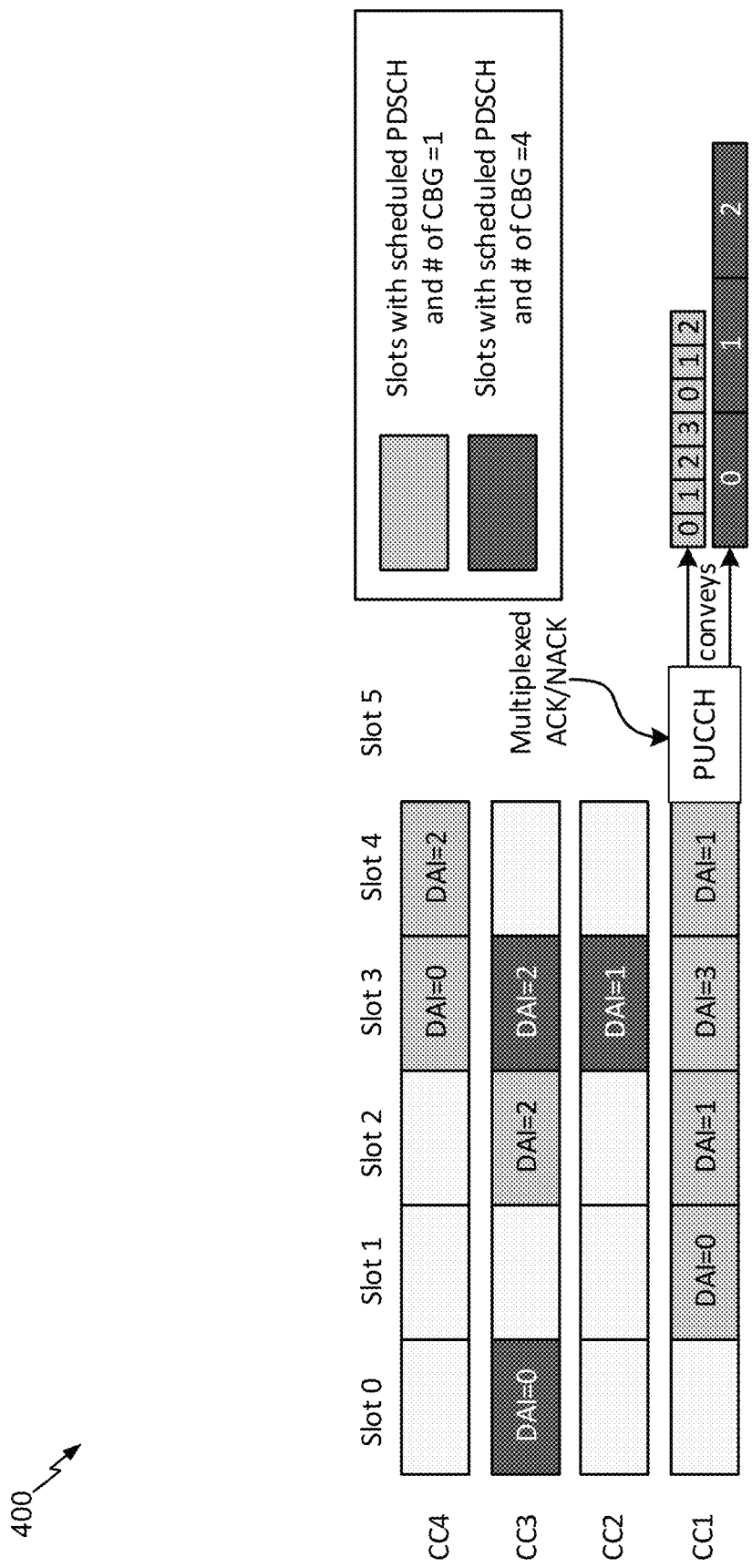

FIG. 4 is a diagram illustrating another example 400 of using downlink assignment indexes for HARQ ACK/NACK feedback, in accordance with various aspects of the present disclosure.

In NR, a TB may be divided into one or more code block groups (CBGs), where each CBG is separately acknowledged or negatively acknowledged to prevent retransmission of large TBs. In some aspects, the number of CBGs per TB may be configured dynamically or semi-statically, such as using a radio resource control (RRC) configuration. The number of HARQ ACK/NACK bits transmitted for a TB may equal the number of CBGs for that TB. Using the DAI mechanism described above in connection with FIG. 3, even if the UE 120 can detect missing grants, the UE 120 may not be capable of inferring the expected HARQ ACK/NACK payload size (e.g., the number of bits) for the missing grants. To solve this issue, multiple DAI groups may be used, where each DAI group uses a different DAI for different HARQ ACK/NACK payload sizes.

For example, as shown in FIG. 4, a multiple DAI group mechanism may include CC1 and CC4 configured with TB-based retransmission (e.g., the number of CBGs per TB is one), and CC2 and CC3 configured with CBG-based retransmission with the number of CBGs per TB equal to 4. In this case, the HARQ ACK/NACK feedback will include one bit for each TB granted on CC1 and CC4, and the HARQ ACK/NACK feedback will include four bits for each TB granted on CC2 and CC3. In this case, a first DAI counter is used for CC1 and CC4 (shown in light gray), and a second DAI counter is used for CC2 and CC3 (shown in dark gray). Note that slot 2 in CC3 is labeled as TB-based because the base station 110 may use fallback DCI for a particular slot to indicate TB-based transmission even though the component carrier has CBGs enabled by default (e.g., in some cases, a CBG configuration may be dynamically overridden). Using multiple DAI counters for different DAI groups adds further complexity to the HARQ ACK/NACK process, and increases a likelihood of ambiguities between the base station 110 and the UE 120 regarding a size of HARQ ACK/NACK feedback for different DAI groups. Some techniques and apparatuses described herein reduce or eliminate ambiguities between the base station 110 and the UE 120 regarding HARQ ACK/NACK feedback when the UE 120 misses the last downlink grant in a bundling window, when the UE 120 is associated with multiple DAI groups, and/or the like.

As indicated above, FIG. 4 is provided as an example. Other examples are possible and may differ from what was described with respect to FIG. 4.

Figure 5:
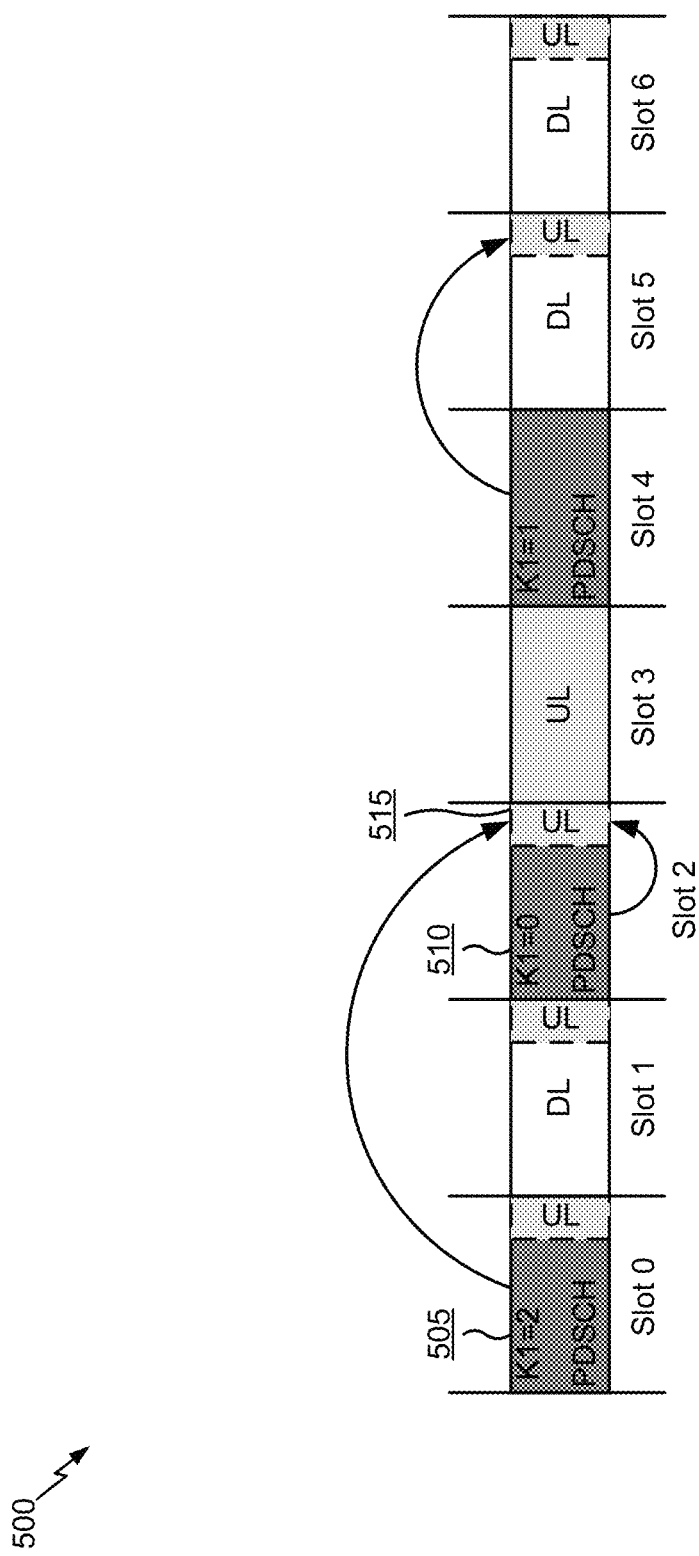
FIG. 5 is a diagram illustrating an example of using a bundling window for HARQ ACK/NACK feedback, in accordance with various aspects of the present disclosure.

FIG. 5 is a diagram illustrating an example 500 of using a bundling window for HARQ ACK/NACK feedback, in accordance with various aspects of the present disclosure.

In NR, a downlink grant may indicate a timing between downlink assignment (e.g., a slot in which the downlink grant is received) and a corresponding downlink communication (e.g., on the physical downlink shared channel (PDSCH)). For example, this timing may be indicated by a field in DCI, and may be referred to as a K0 value. Similarly, an uplink grant may indicate a timing between uplink assignment and a corresponding uplink communication. Additionally, or alternatively, a downlink grant may indicate a timing between reception of a downlink communication (e.g., on the PDSCH) and a corresponding ACK/NACK indication (e.g., HARQ ACK/NACK feedback for the downlink communication). For example, this timing may be indicated by a field in DCI, and may be referred to as a K1 value.

As shown by reference number 505, a downlink communication (e.g., a PDSCH communication), received by a UE 120 in slot 0, may be associated with a K1 value of 2. This K1 value may indicate a subsequent slot in which HARQ ACK/NACK feedback, corresponding to the downlink communication, is to be transmitted by the UE 120. For example, the K1 value of 2 indicates that the HARQ ACK/NACK feedback for the downlink communication is to occur 2 slots after the slot in which the downlink communication is received (e.g., 2 slots after slot 0). In this case, the downlink communication is received in slot 0, and the K1 value of 2 indicates that the HARQ ACK/NACK feedback for downlink communication is to occur in slot 2.

Similarly, as shown by reference number 510, a downlink communication, received by the UE 120 in slot 2, may be associated with a K1 value of 0. This K1 value of 0 indicates that the HARQ ACK/NACK feedback for the downlink communication is to occur 0 slots after the slot in which the downlink communication is received (e.g., 0 slots after slot 2). In other words, a K1 value of 0 indicates that the HARQ ACK/NACK feedback for the downlink communication is to occur in the same slot as the downlink communication. In this case, the HARQ ACK/NACK feedback may be referred to as an immediate HARQ ACK/NACK because the HARQ ACK/NACK feedback occurs in the same slot as the corresponding downlink communication.

As shown by reference number 515, the UE 120 may transmit HARQ ACK/NACK feedback, corresponding to the downlink communications received in both slot 0 and slot 2, in an uplink portion of slot 2. In some aspects, the HARQ ACK/NACK feedback may include multiplexed or bundled HARQ ACK/NACK indications (e.g., ACK/NACK bits) for a bundling window, which includes all HARQ ACK/NACK feedback for downlink communications to be acknowledged or negatively acknowledged in the same slot.

As used herein, a bundling window may include a set of slots with a set of scheduled downlink communications (e.g., PDSCH communications), including received downlink communications (e.g., scheduled PDSCH communications received by a UE 120) and unreceived downlink communications (e.g., scheduled PDSCH communications not received by the UE 120). A bundling window may be associated with HARQ ACK/NACK multiplexing and/or HARQ ACK/NACK bundling. For example, a bundling window may include a number of slots, where downlink communications received in those slots are to be acknowledged or negatively acknowledged together using HARQ ACK/NACK multiplexing and/or HARQ ACK/NACK bundling (e.g., in a same uplink transmission time interval, such as a slot or a portion of a slot). In some aspects, a bundling window may include multiple slots with downlink grants that point to the same slot for HARQ ACK/NACK feedback. For example, the bundling window for HARQ ACK/NACK feedback reported in slot 2 may include slot 0 and slot 2. Thus, a size of the bundling window may be dynamically configured in NR, and may include consecutive or non-consecutive slots.

In example 500, if the UE 120 were to miss the downlink grant in slot 2, then the UE 120 would transmit HARQ ACK/NACK feedback only for the downlink grant in slot 0, and not for the downlink grant in slot 2. In this case, the UE 120 would be unable to use DAI from slot 2 to determine that a downlink grant was missed in slot 2 because the UE 120 missed the downlink grant in slot 2 (e.g., including the DAI in the downlink grant), and would be unable to use DAI from any subsequent slots to determine that the downlink grant was missed in slot 2 because slot 2 is the last slot in the bundling window in which a downlink grant is transmitted. This leads to an ambiguity between the base station 110 and the UE 120 regarding HARQ ACK/NACK feedback because the base station 110 is expecting to receive HARQ ACK/NACK feedback for both the downlink grant in slot 0 and the downlink grant in slot 2, whereas the UE 120 would only transmit HARQ ACK/NACK feedback for the downlink grant in slot 0 (e.g., because the UE 120 missed the downlink grant in slot 2 and was unable to determine that this downlink grant was missed).

Some techniques and apparatuses described herein reduce or eliminate ambiguities between the base station 110 and the UE 120 regarding HARQ ACK/NACK feedback when the UE 120 misses the last downlink grant in a bundling window, when the UE 120 is associated with multiple DAI groups, and/or the like.

As indicated above, FIG. 5 is provided as an example. Other examples are possible and may differ from what was described with respect to FIG. 5.

In some aspects, to reduce or eliminate ambiguities between the base station 110 and the UE 120 regarding HARQ ACK/NACK feedback when the UE 120 misses the last downlink grant in a bundling window, the base station 110 may signal a total DAI using DCI other than a downlink grant. In some aspects, the UE 120 may transmit ACK/ACK feedback only when the DCI is received, thereby reducing or eliminating ambiguities regarding ACK/NACK feedback when the UE 120 misses the last downlink grant in a bundling window. In some aspects, this DCI may be transmitted in a final slot of a bundling window to provide an accurate count of the number of downlink grants transmitted to the UE 120 in the bundling window. The UE 120 may monitor the final slot of the bundling window for the total DAI included in the separate DCI that is not a downlink grant, and may transmit ACK/NACK feedback only when the total DAI is received in the final slot, thereby reducing or eliminating ambiguities regarding ACK/NACK feedback when the UE 120 misses the last downlink grant in a bundling window.

Additional details are provided below in connection with process 600 of FIG. 6 and process 700 of FIG. 7. In some aspects, process 600 and/or process 700 may be used when the UE 120 transmits ACK/NACK feedback via a physical uplink control channel (PUCCH).

Figure 6:
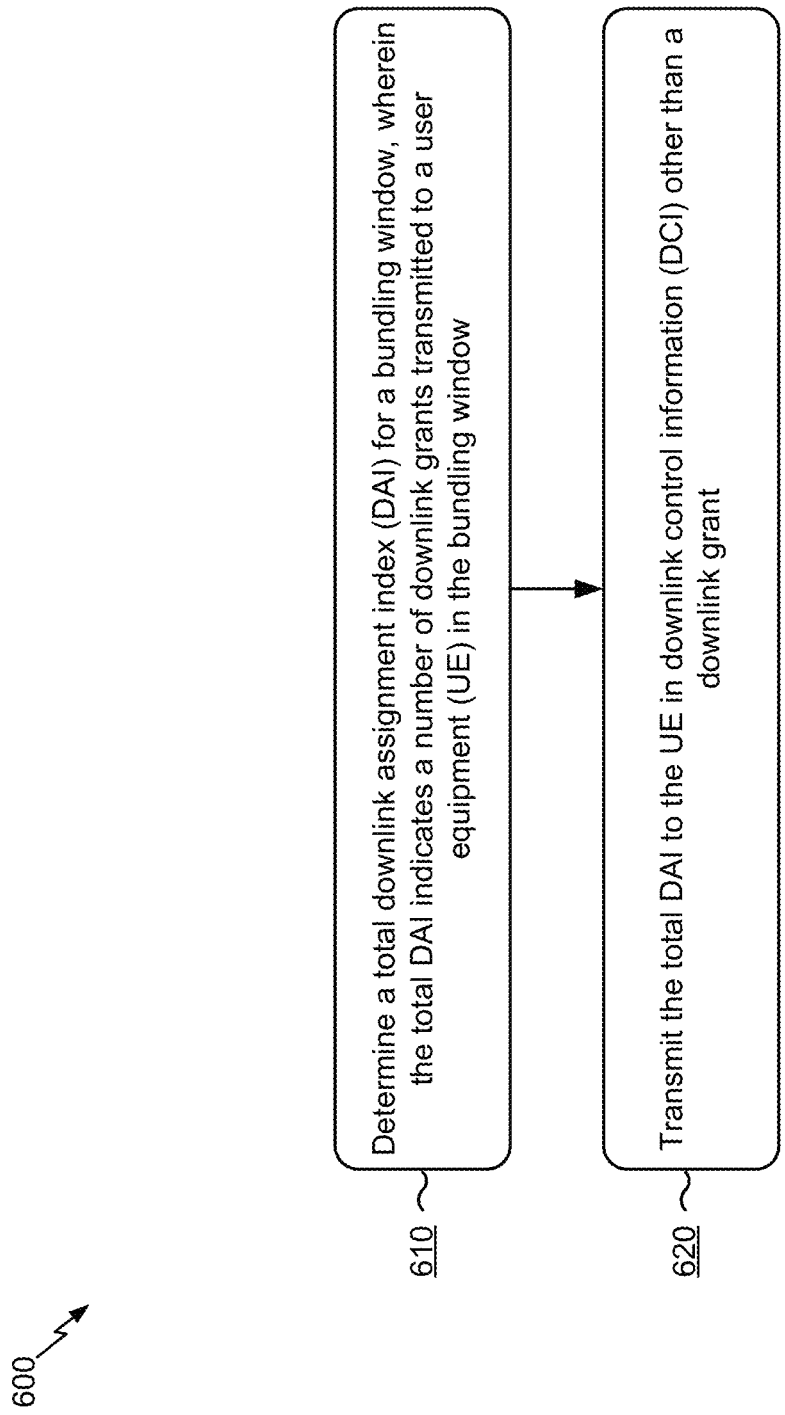
FIGS. 6-13 are diagrams illustrating example processes relating to using a downlink assignment index (DAI) in New Radio, in accordance with various aspects of the present disclosure.

FIG. 6 is a diagram illustrating an example process 600 performed, for example, by a base station, in accordance with various aspects of the present disclosure. Example process 600 is an example where a base station (e.g., base station 110 and/or the like) uses DAI in New Radio.

As shown in FIG. 6, in some aspects, process 600 may include determining a total downlink assignment index (DAI) for a bundling window, wherein the total DAI indicates a number of downlink grants transmitted to a user equipment (UE) in the bundling window (block 610). For example, the base station may determine (e.g., using controller/processor 240 and/or the like) a total DAI for a bundling window. The total DAI may indicate a number of downlink grants transmitted to a UE in the bundling window. The bundling window may be a dynamic bundling window determined based at least in part on one or more timing indications received in one or more downlink grants, as described above in connection with FIG. 5.

As further shown in FIG. 6, in some aspects, process 600 may include transmitting the total DAI to the UE in downlink control information (DCI) other than a downlink grant (block 620). For example, the base station may transmit (e.g., using transmit processor 220, TX MIMO processor 230, MOD 232, antenna 234, and/or the like) the total DAI to the UE. The total DAI may be transmitted in DCI other than a downlink grant. In this way, the UE may receive an accurate count of the number of downlink grants transmitted in the bundling window even if the UE misses the last downlink grant in the bundling window (e.g., which would normally include the DAI used by the UE), thereby reducing or eliminating HARQ ACK/NACK ambiguities between the UE and the base station.

For example, if the UE misses the total DAI in the DCI other than a downlink grant, the UE may prevent HARQ ACK/NACK feedback from being reported in an initial opportunity (e.g., in the slot indicated by the downlink grants in the bundling window for HARQ ACK/NACK feedback). When the base station fails to receive the HARQ ACK/NACK feedback as expected, the base station and/or the UE may coordinate retransmissions (e.g., the base station may retransmit one or more downlink grants for the UE).

Process 600 may include additional aspects, such as any single aspect or any combination of aspects described below and/or in connection with one or more other processes described herein.

In some aspects, the total DAI is transmitted in a final slot of the bundling window. This may ensure an accurate indication of the number of downlink grants transmitted in the bundling window. In some aspects, the total DAI is transmitted in a slot other than a final slot of the bundling window. In this case, the total DAI may include an estimate of the number of downlink grants to be transmitted to the UE in the bundling window.

In some aspects, the total DAI is one of multiple total DAIs transmitted to the UE in the DCI. The multiple total DAIs may correspond to multiple DAI groups associated with the UE. Each of the multiple DAI groups may be associated with a different set of component carriers used for carrier aggregation, as described above in connection with FIG. 4. In this way, ambiguities between the UE and the base station regarding HARQ ACK/NACK feedback for different DAI groups may be reduced or eliminated.

In some aspects, the total DAI is indicated in the DCI using more than two bits. For example, as described above in connection with FIG. 3, in some aspects, DAI values included in downlink grants may be limited to 2 bits to ensure that enough bits remain to indicate other information needed in a downlink grant (e.g., a K0 value, a K1 value, and/or the like). When the total DAI is indicated in DCI other than a downlink grant, such limitations need not apply. Thus, more than 2 bits may be used for the total DAI, resulting in a more robust HARQ ACK/NACK mechanism. For example, the total DAI in the DCI other than a downlink grant may include 3 bits, 4 bits, and/or the like.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
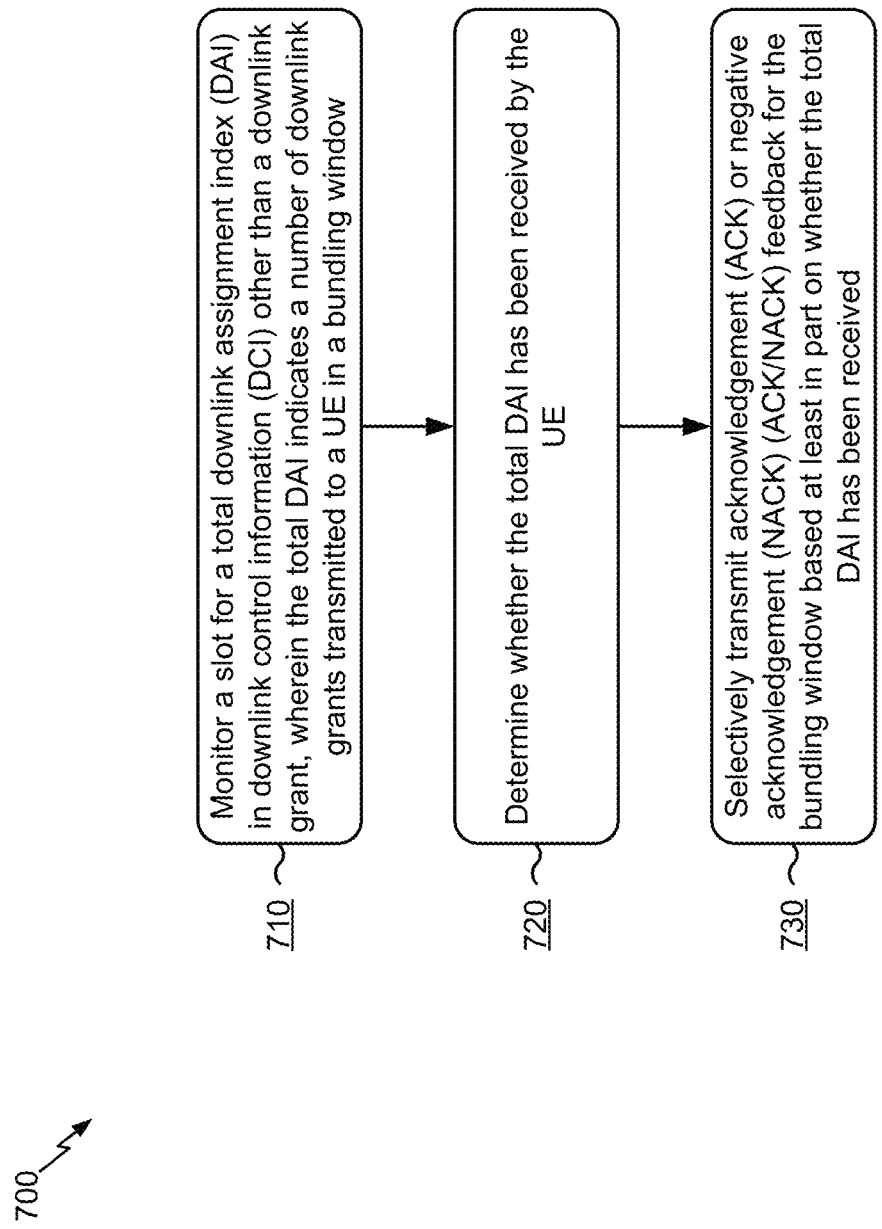

FIG. 7 is a diagram illustrating an example process 700 performed, for example, by a UE, in accordance with various aspects of the present disclosure. Example process 700 is an example where a UE (e.g., UE 120 and/or the like) uses DAI in New Radio.

As shown in FIG. 7, in some aspects, process 700 may include monitoring a slot for a total downlink assignment index (DAI) in downlink control information (DCI) other than a downlink grant, wherein the total DAI indicates a number of downlink grants transmitted to the UE in a bundling window (block 710). For example, the UE may monitor (e.g., using antenna 252, DEMOD 254, MIMO detector 256, receive processor 258, and/or the like) a slot for a total DAI in downlink control information (DCI) other than a downlink grant. The total DAI may indicate a number of downlink grants transmitted to the UE in a bundling window. In this way, the UE may receive an accurate count of the number of downlink grants transmitted in the bundling window even if the UE misses the last downlink grant in the bundling window, as described above in connection with FIG. 6.

As further shown in FIG. 7, in some aspects, process 700 may include determining whether the total DAI has been received by the UE (block 720). For example, the UE may determine (e.g., using controller/processor 280 and/or the like) whether the total DAI has been received by the UE. For example, the UE may determine whether the UE has received the DCI, other than a downlink grant, that includes the total DAI.

As further shown in FIG. 7, in some aspects, process 700 may include selectively transmitting acknowledgement (ACK) or negative acknowledgement (NACK) (ACK/NACK) feedback for the bundling window based at least in part on whether the total DAI has been received (block 730). For example, the UE may selectively transmit (e.g., using controller/processor 280 and/or the like to determine whether to transmit, using transmit processor 264, TX MIMO processor 266, MOD 254, antenna 252, and/or the like to transmit) ACK/NACK feedback for the bundling window based at least in part on determining whether the total DAI has been received.

For example, if the total DAI has been received in the DCI other than a downlink grant, then the UE (e.g., controller processor 280 and/or the like) may instruct one or more components of UE (e.g., transmit processor 264, TX MIMO processor 266, MOD 254, antenna 252, and/or the like) to transmit the ACK/NACK feedback for the bundling window. Alternatively, if the total DAI has not been received in the DCI other than a downlink grant, then the UE (e.g., controller processor 280 and/or the like) may not provide ACK/NACK feedback to one or more components of the UE for transmission (e.g., transmit processor 264, TX MIMO processor 266, MOD 254, antenna 252, and/or the like). In this way, the UE may prevent transmission of potentially ambiguous ACK/NACK feedback.

Process 700 may include additional aspects, such as any single aspect or any combination of aspects described below and/or in connection with one or more other processes described herein.

In some aspects, transmission of the ACK/NACK feedback in an initial uplink opportunity is prevented based at least in part on a determination that the total DAI has not been received. In some aspects, the ACK/NACK feedback is transmitted in an initial uplink opportunity based at least in part on a determination that the total DAI has been received. For example, if the UE misses the total DAI in the DCI other than a downlink grant, the UE may prevent HARQ ACK/NACK feedback from being reported in an initial opportunity (e.g., in the slot indicated by the downlink grants in the bundling window for HARQ ACK/NACK feedback). When the base station fails to receive the HARQ ACK/NACK feedback as expected, the base station and/or the UE may coordinate retransmissions (e.g., the base station may retransmit one or more downlink grants for the UE).

In some aspects, the slot is a final slot of the bundling window. This may ensure an accurate indication of the number of downlink grants transmitted in the bundling window. In some aspects, the slot is not a final slot of the bundling window. In some aspects, the total DAI includes an estimate of the number of downlink grants to be transmitted to the UE in the bundling window.

In some aspects, the total DAI is one of multiple total DAIs indicated in the DCI, wherein the multiple total DAIs correspond to multiple DAI groups associated with the UE, wherein each of the multiple DAI groups is associated with a different set of component carriers used for carrier aggregation. In this way, ambiguities between the UE and the base station regarding HARQ ACK/NACK feedback for different DAI groups may be reduced or eliminated, as described above in connection with FIG. 6.

In some aspects, the total DAI is indicated in the DCI using more than two bits. In this way, the HARQ ACK/NACK mechanism may be more robust, as described above in connection with FIG. 6.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

In some aspects, to reduce or eliminate ambiguities between the base station 110 and the UE 120 regarding HARQ ACK/NACK feedback when the UE 120 misses the last downlink grant in a bundling window, the base station 110 may signal a total DAI using a downlink grant that is transmitted in a final slot of a bundling window, thereby providing an accurate count of the number of downlink grants transmitted to the UE 120 in the bundling window. The UE 120 may monitor the final slot of the bundling window for the total DAI, and may transmit ACK/NACK feedback only when the downlink grant is received in the final slot, thereby reducing or eliminating ambiguities regarding ACK/NACK feedback. In some aspects, the downlink grant may include a downlink assignment for the UE 120 in addition to the total DAI. In some aspects, the downlink grant may not include any downlink assignments for the UE 120 (e.g., may be a dummy downlink grant), and may only include the total DAI.

Additional details are provided below in connection with process 800 of FIG. 8 and process 900 of FIG. 9. In some aspects, process 800 and/or process 900 may be used when the UE 120 transmits ACK/NACK feedback via a physical uplink control channel (PUCCH).

Figure 8:
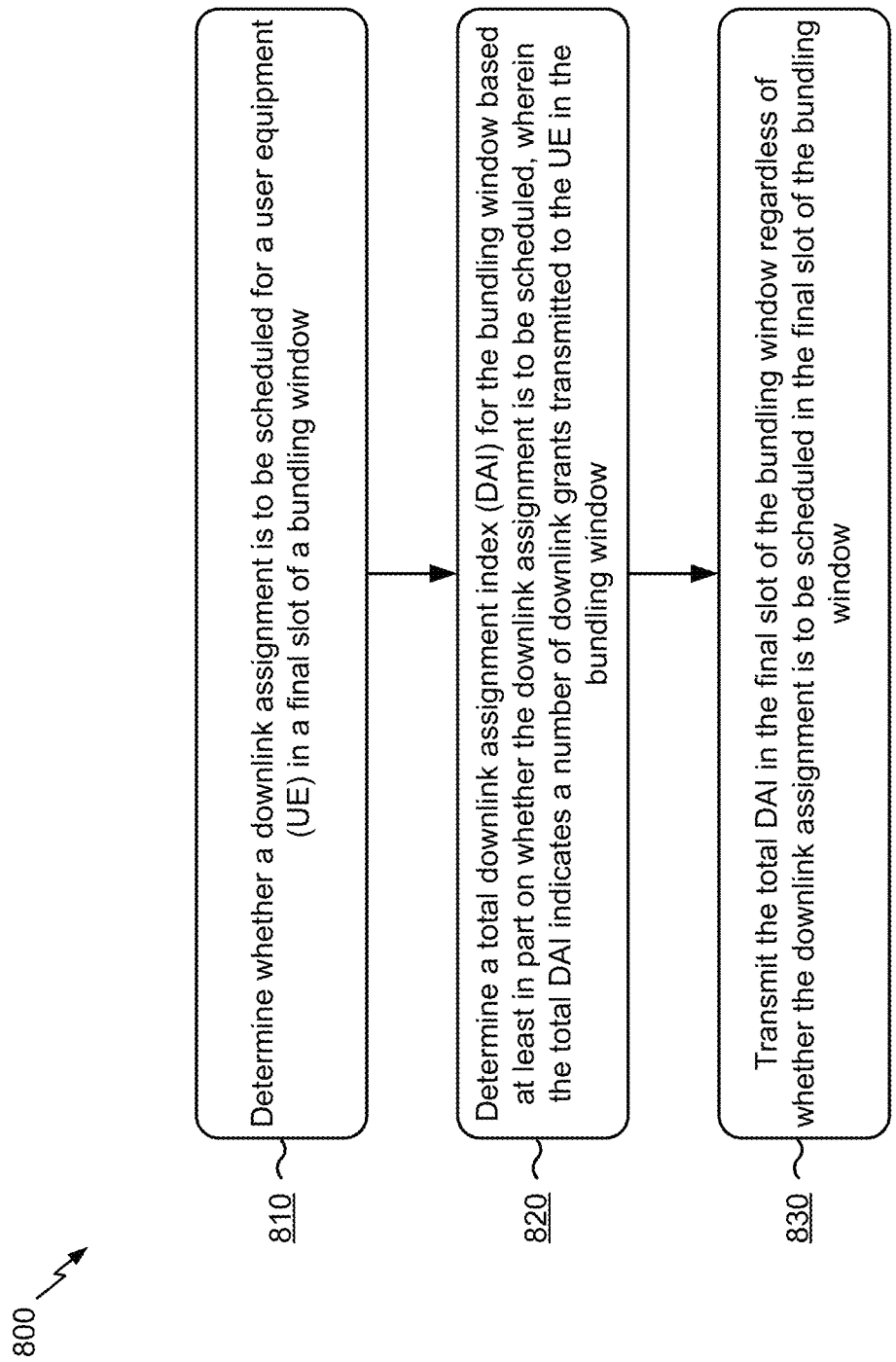

FIG. 8 is a diagram illustrating an example process 800 performed, for example, by a base station, in accordance with various aspects of the present disclosure. Example process 800 is an example where a base station (e.g., base station 110 and/or the like) uses DAI in New Radio.

As shown in FIG. 8, in some aspects, process 800 may include determining whether a downlink assignment is to be scheduled for a user equipment (UE) in a final slot of a bundling window (block 810). For example, the base station may determine (e.g., using controller/processor 240 and/or the like) whether a downlink assignment is to be scheduled for a UE in a final slot of a bundling window.

As further shown in FIG. 8, in some aspects, process 800 may include determining a total downlink assignment index (DAI) for the bundling window based at least in part on whether the downlink assignment is to be scheduled, wherein the total DAI indicates a number of downlink grants transmitted to the UE in the bundling window (block 820). For example, the base station may determine (e.g., using controller/processor 240 and/or the like) a total DAI for the bundling window based at least in part on whether the downlink assignment is to be scheduled. The total DAI may indicate a number of downlink grants transmitted to the UE in the bundling window. Thus, the total DAI may be incremented (e.g., from a previously transmitted total DAI) if a downlink assignment is to be scheduled for the UE in the final slot of the bundling window, and may not be incremented if a downlink assignment is not to be scheduled for the UE in the final slot of the bundling window.

As further shown in FIG. 8, in some aspects, process 800 may include transmitting the total DAI in the final slot of the bundling window regardless of whether the downlink assignment is to be scheduled in the final slot of the bundling window (block 830). For example, the base station may transmit (e.g., using transmit processor 220, TX MIMO processor 230, MOD 232, antenna 234, and/or the like) the total DAI in the final slot of the bundling window regardless of whether the downlink assignment is to be scheduled in the final slot of the bundling window. In this way, the base station may guarantee that the UE has an accurate indication of the number of downlink grants transmitted to the UE in the bundling window because no downlink grants will be transmitted to the UE for the bundling window after the final slot of the bundling window.

Process 800 may include additional aspects, such as any single aspect or any combination of aspects described below and/or in connection with one or more other processes described herein.

In some aspects, the total DAI is transmitted in a downlink grant that schedules a downlink assignment for the UE in the final slot of the bundling window based at least in part on a determination that a downlink assignment is to be scheduled for the UE in the final slot of the bundling window. For example, the total DAI may be transmitted in a downlink grant that includes downlink assignment information (e.g., a K0 value, a K1 value, and/or the like). In this case (e.g., when a downlink assignment is to be scheduled for the UE in the final slot of the bundling window), the total DAI may be different from a most recently transmitted total DAI for the UE. For example, the total DAI transmitted in the downlink grant in the final slot may be incremented from the most recently transmitted total DAI for the UE (e.g., transmitted in a previous slot of the bundling window).

In some aspects, the total DAI is transmitted in a dummy downlink grant that does not schedule any downlink assignments for the UE based at least in part on a determination that a downlink assignment is not to be scheduled for the UE in the final slot of the bundling window. For example, the total DAI may be transmitted in a dummy downlink grant that does not include downlink assignment information (e.g., that does not include a K0 value, a K1 value, and/or the like). Additionally, or alternatively, the total DAI may be transmitted in DCI other than a downlink grant, as described above in connection with FIGS. 6 and 7. In this case (e.g., when a downlink assignment is not to be scheduled for the UE in the final slot of the bundling window), the total DAI may be the same as a most recently transmitted total DAI for the UE. For example, the total DAI transmitted in the dummy downlink grant in the final slot may not be incremented from the most recently transmitted total DAI for the UE (e.g., transmitted in a previous slot of the bundling window).

In some aspects, the total DAI is one of multiple total DAIs transmitted to the UE in the final slot of the bundling window. The multiple total DAIs may correspond to multiple DAI groups associated with the UE, and each of the multiple DAI groups may be associated with a different set of component carriers used for carrier aggregation, as described above in connection with FIG. 4. In this way, ambiguities between the UE and the base station regarding HARQ ACK/NACK feedback for different DAI groups may be reduced or eliminated.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
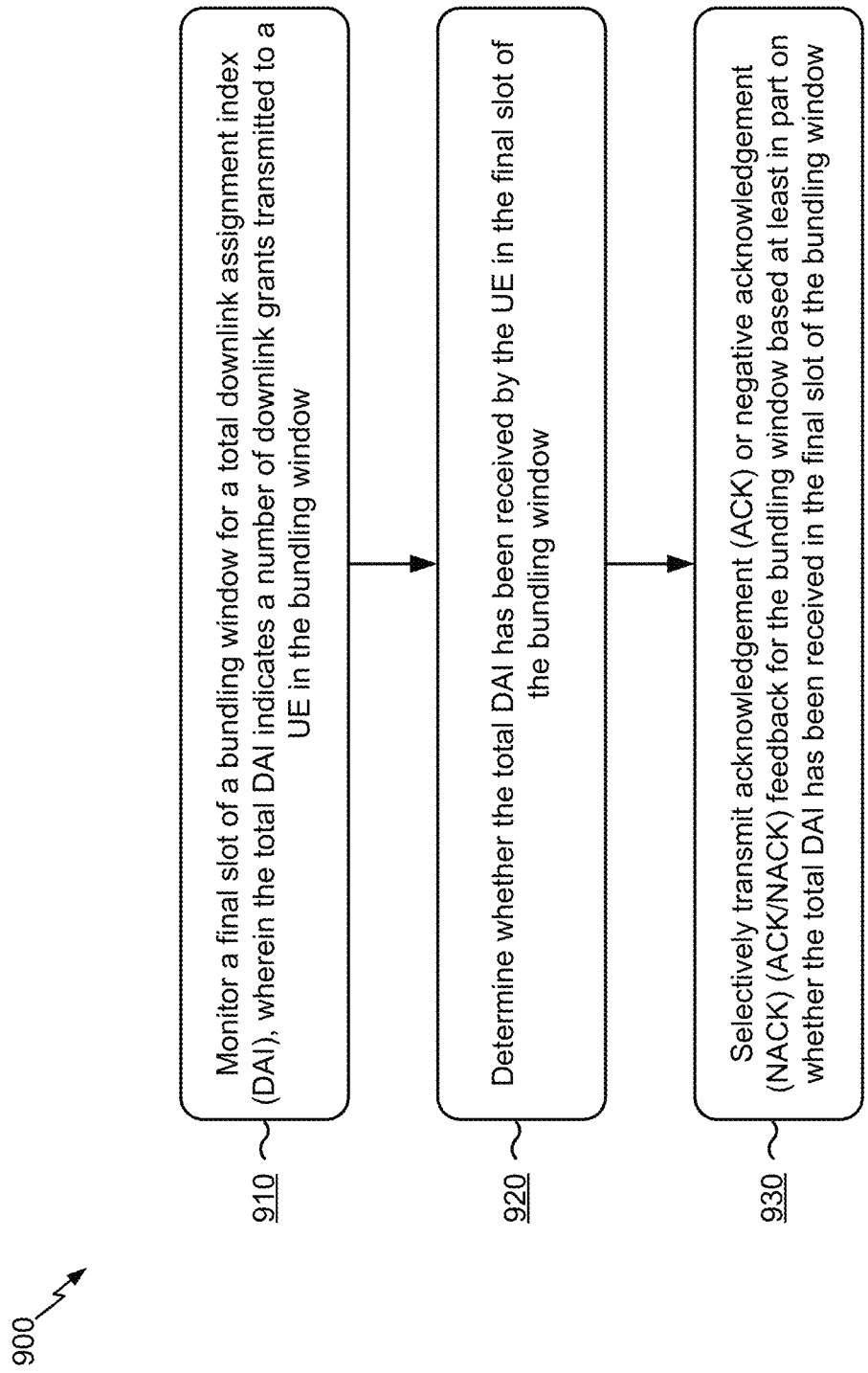

FIG. 9 is a diagram illustrating an example process 900 performed, for example, by a UE, in accordance with various aspects of the present disclosure. Example process 900 is an example where a UE (e.g., UE 120 and/or the like) uses DAI in New Radio.

As shown in FIG. 9, in some aspects, process 900 may include monitoring a final slot of a bundling window for a total downlink assignment index (DAI), wherein the total DAI indicates a number of downlink grants transmitted to the UE in the bundling window (block 910). For example, the UE may monitor (e.g., using antenna 252, DEMOD 254, MIMO detector 256, receive processor 258, and/or the like) a final slot of a bundling window for a total DAI. The total DAI may indicate a number of downlink grants transmitted to the UE in the bundling window.

As further shown in FIG. 9, in some aspects, process 900 may include determining whether the total DAI has been received by the UE in the final slot of the bundling window (block 920). For example, the UE may determine (e.g., using controller/processor 280 and/or the like), whether the total DAI has been received by the UE in the final slot of the bundling window.

As further shown in FIG. 9, in some aspects, process 900 may include selectively transmitting acknowledgement (ACK) or negative acknowledgement (NACK) (ACK/NACK) feedback for the bundling window based at least in part on whether the total DAI has been received in the final slot of the bundling window (block 930). For example, the UE may selectively transmit (e.g., using controller/processor 280 and/or the like to determine whether to transmit, using transmit processor 264, TX MIMO processor 266, MOD 254, antenna 252, and/or the like to transmit) ACK/NACK feedback for the bundling window based at least in part on determining whether the total DAI has been received in the final slot of the bundling window.

For example, if the total DAI has been received in the final slot of the bundling window, then the UE (e.g., controller processor 280 and/or the like) may instruct one or more components of UE (e.g., transmit processor 264, TX MIMO processor 266, MOD 254, antenna 252, and/or the like) to transmit the ACK/NACK feedback for the bundling window. Alternatively, if the total DAI has not been received in the final slot of the bundling window, then the UE (e.g., controller processor 280 and/or the like) may not provide ACK/NACK feedback to one or more components of the UE for transmission (e.g., transmit processor 264, TX MIMO processor 266, MOD 254, antenna 252, and/or the like). In this way, the UE may prevent transmission of potentially ambiguous ACK/NACK feedback.

Process 900 may include additional aspects, such as any single aspect or any combination of aspects described below and/or in connection with one or more other processes described herein.

In some aspects, transmission of the ACK/NACK feedback in an initial uplink opportunity is prevented based at least in part on a determination that the total DAI has not been received in the final slot of the bundling window. In some aspects, the ACK/NACK feedback is transmitted in an initial uplink opportunity based at least in part on a determination that the total DAI has been received in the final slot of the bundling window. For example, if the UE misses the total DAI in the final slot of the bundling window, the UE may prevent HARQ ACK/NACK feedback from being reported in an initial opportunity (e.g., in the slot indicated by the downlink grants in the bundling window for HARQ ACK/NACK feedback). When the base station fails to receive the HARQ ACK/NACK feedback as expected, the base station and/or the UE may coordinate retransmissions (e.g., the base station may retransmit one or more downlink grants for the UE).

In some aspects, the total DAI is received in a downlink grant that schedules a downlink assignment for the UE in the final slot of the bundling window. In some aspects, the total DAI is received in a dummy downlink grant that does not schedule any downlink assignments for the UE.

In some aspects, the total DAI is one of multiple total DAIs indicated in the final slot of the bundling window, wherein the multiple total DAIs correspond to multiple DAI groups associated with the UE, wherein each of the multiple DAI groups is associated with a different set of component carriers used for carrier aggregation. In this way, ambiguities between the UE and the base station regarding HARQ ACK/NACK feedback for different DAI groups may be reduced or eliminated.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

In some aspects, to reduce or eliminate ambiguities between the base station 110 and the UE 120 regarding HARQ ACK/NACK feedback when the UE 120 misses the last downlink grant in a bundling window, the base station 110 may signal a total DAI using a common downlink control communication (e.g., a group common PDCCH communication) associated with multiple UEs 120. In this way, network resources may be conserved by using a common downlink control communication to indicate different total DAIs corresponding to different UEs 120.

Additional details are provided below in connection with process 1000 of FIG. 10 and process 1100 of FIG. 11. In some aspects, process 1000 and/or process 1100 may be used when the UE 120 transmits ACK/NACK feedback via a physical uplink control channel (PUCCH).

Figure 10:
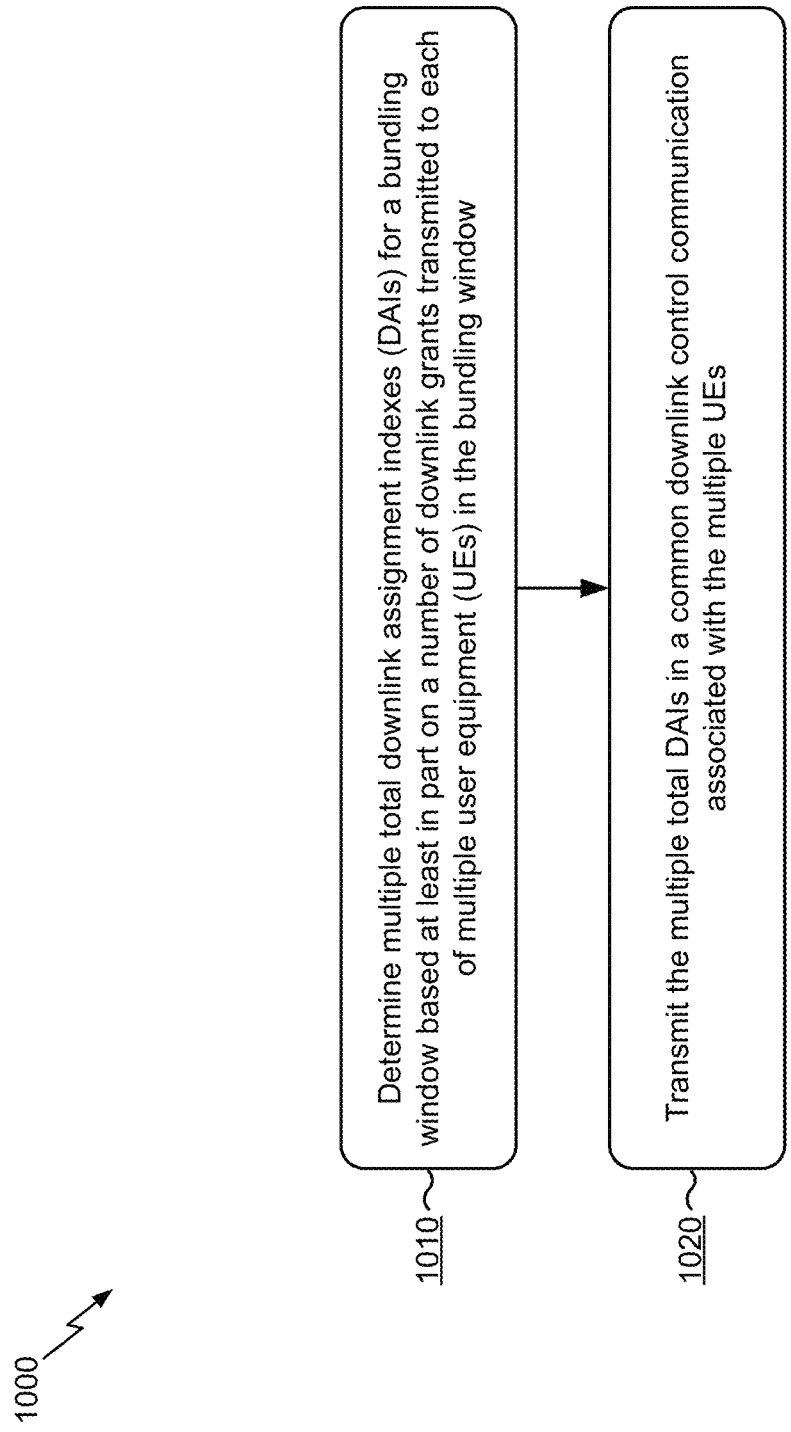

FIG. 10 is a diagram illustrating an example process 1000 performed, for example, by a base station, in accordance with various aspects of the present disclosure. Example process 1000 is an example where a base station (e.g., base station 110 and/or the like) uses DAI in New Radio.

As shown in FIG. 10, in some aspects, process 1000 may include determining multiple total downlink assignment indexes (DAIs) for a bundling window based at least in part on a number of downlink grants transmitted to each of multiple user equipment (UEs) in the bundling window (block 1010). For example, the base station may determine (e.g., using controller/processor 240 and/or the like) multiple total DAIs for a bundling window based at least in part on a number of downlink grants transmitted to each of multiple user equipment (UEs) in the bundling window. For example, the base station may determine a first total DAI for a first UE, may determine a second total DAI for a second UE, and/or the like. The base station may transmit control information (e.g., a power control command, a total DAI, and/or the like) to the multiple UEs using the same common downlink control communication, as described below.

As further shown in FIG. 10, in some aspects, process 1000 may include transmitting the multiple total DAIs in a common downlink control communication associated with the multiple UEs (block 1020). For example, the base station may transmit (e.g., using transmit processor 220, TX MIMO processor 230, MOD 232, antenna 234, and/or the like) the multiple total DAIs in a common downlink control communication associated with the multiple UEs. In some aspects, the common downlink control communication is a group common physical downlink control channel (PDCCH) communication.

Process 1000 may include additional aspects, such as any single aspect or any combination of aspects described below and/or in connection with one or more other processes described herein.

In some aspects, the common downlink control communication includes multiple fields for indicating the multiple total DAIs. In this way, a UE may uniquely identify a total DAI that corresponds to the UE.

In some aspects, a field of the common downlink control communication in which a total DAI, of the multiple total DAIs, is to be indicated is determined based at least in part on a hash value associated with a UE corresponding to the total DAI. For example, a UE may use a hash value (e.g., a UE identifier, an index assigned to the UE, and/or the like) to identify which DAI field of the common downlink control communication includes the total DAI for the UE. The base station may store the hash value that will be used by the UE, and may insert the total DAI into the DAI field that the UE will identify using the hash value.

In some aspects, the multiple total DAIs include a set of total DAIs associated with a single UE, wherein each total DAI, in the set of total DAIs, is associated with a different set of component carriers used by the single UE for carrier aggregation. For example, a DAI field of the common downlink control communication may include a total DAI corresponding to a particular DAI group for a UE. In this case, the common downlink control communication may include multiple total DAIs for a single UE, where the multiple total DAIs correspond to different DAI groups of the UE. Thus, in some aspects, the number of DAI fields included in the common downlink control communication may be greater than the number of UEs associated with the common downlink control communication. In some aspects, a DAI field may be reused for multiple UEs, such as when two UEs share a total DAI, when two UEs share a total DAI for at least one DAI group, and/or the like.

In some aspects, a set of fields of the common downlink control communication in which the set of total DAIs is to be indicated is determined based at least in part on a set of hash values associated with the single UE. For example, a UE may use a set of hash values (e.g., determined based at least in part on a UE identifier, based at least in part on an index assigned to the UE, and/or the like) to identify which DAI fields of the common downlink control communication include the total DAI for the DAI groups of the UE. The base station may determine the set of hash values that will be used by the UE, and may insert the total DAIs into the DAI fields that the UE will identify using the set of hash values.

In some aspects, a field of the common downlink control communication is configured to indicate a maximum total DAI of at least two UEs based at least in part on a determination that the at least two UEs hash to the field. For example, in some cases, multiple UEs may hash to a same DAI field of the common downlink control communication. The base station may identify this scenario, may determine a maximum total DAI associated with the multiple UEs (e.g., by comparing total DAIs associated with the multiple UEs), and may insert the maximum total DAI into the DAI field to which the multiple UEs will hash. In this case, a UE that has received a smaller number of grants than indicated by the maximum total DAI may indicate a NACK for the additional bits, and the base station may ignore these ACK bits (e.g., may not retransmit a downlink grant for the UE because an initial downlink grant was never transmitted for the UE).

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
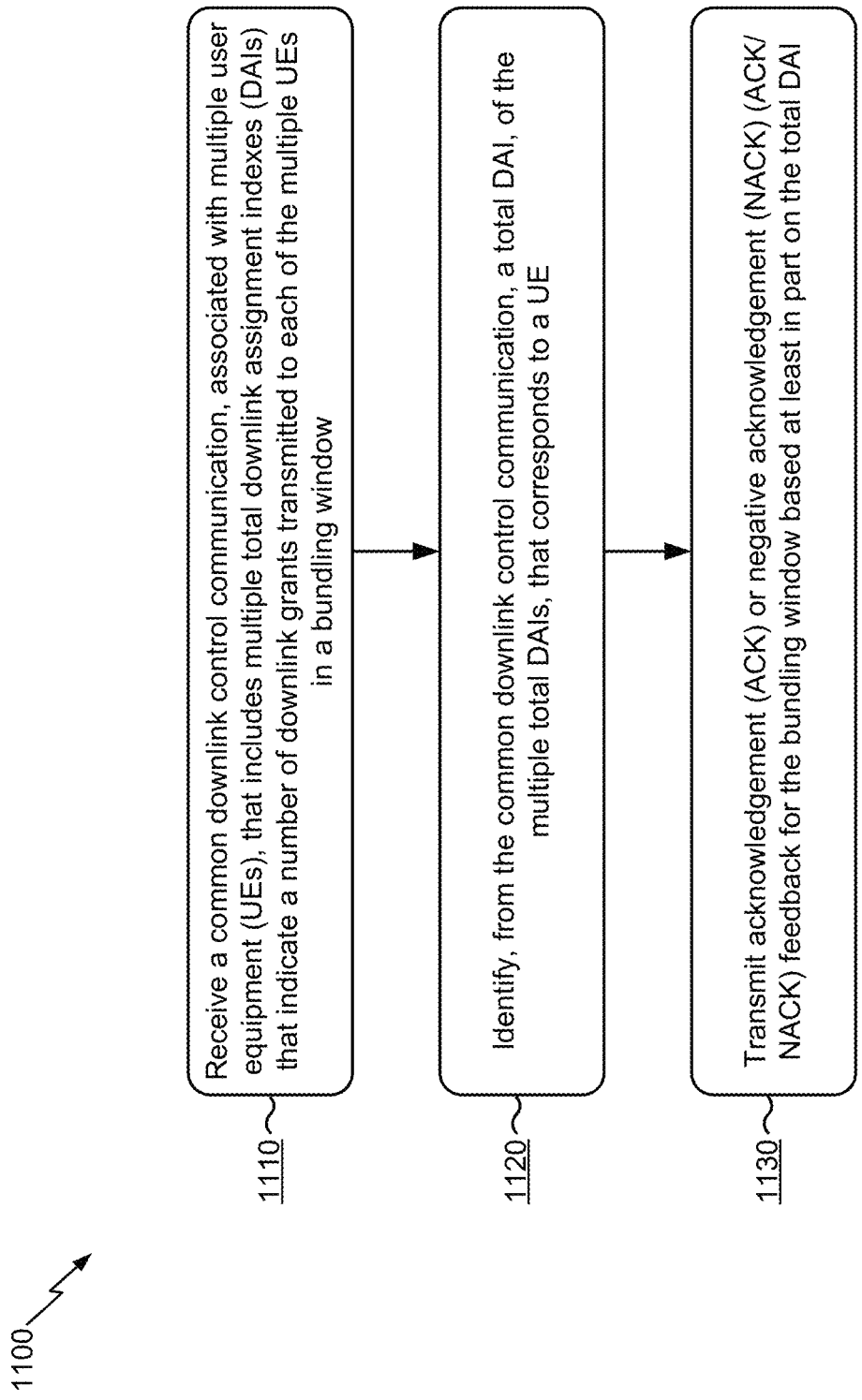

FIG. 11 is a diagram illustrating an example process 1100 performed, for example, by a UE, in accordance with various aspects of the present disclosure. Example process 1100 is an example where a UE (e.g., UE 120 and/or the like) uses DAI in New Radio.

As shown in FIG. 11, in some aspects, process 1100 may include receiving a common downlink control communication, associated with multiple user equipment (UEs), that includes multiple total downlink assignment indexes (DAIs) that indicate a number of downlink grants transmitted to each of the multiple UEs in a bundling window (block 1110). For example, the UE may receive (e.g., using antenna 252, DEMOD 254, MIMO detector 256, receive processor 258, controller/processor 280, and/or the like) a common downlink control communication associated with multiple UEs. The common downlink control communication may include multiple total DAIs that indicate a number of downlink grants transmitted to each of the multiple UEs in a bundling window, as described above in connection with FIG. 10. In some aspects, the common downlink control communication is a group common physical downlink control channel (PDCCH) communication.

As further shown in FIG. 11, in some aspects, process 1100 may include identifying, from the common downlink control communication, a total DAI, of the multiple total DAIs, that corresponds to the UE (block 1120). For example, the UE may identify (e.g., using controller/processor 280 and/or the like), from the common downlink control communication, a total DAI, of the multiple total DAIs, that corresponds to the UE.

As further shown in FIG. 11, in some aspects, process 1100 may include transmitting acknowledgement (ACK) or negative acknowledgement (NACK) (ACK/NACK) feedback for the bundling window based at least in part on the total DAI (block 1130). For example, the UE may selectively transmit (e.g., using controller/processor 280 and/or the like to determine whether to transmit, using transmit processor 264, TX MIMO processor 266, MOD 254, antenna 252, and/or the like to transmit) ACK/NACK feedback for the bundling window based at least in part on the total DAI, in the common downlink control communication, that corresponds to the UE. For example, the UE may transmit ACK/NACK feedback for the bundling window using a number of bits indicated by the total DAI.

Process 1100 may include additional aspects, such as any single aspect or any combination of aspects described below and/or in connection with one or more other processes described herein.

In some aspects, the common downlink control communication includes multiple fields for indicating the multiple total DAIs. In some aspects, the total DAI is identified using a hash value, associated with the UE, that hashes to a field of the common downlink control communication in which the total DAI is indicated, as described above in connection with FIG. 10.

In some aspects, the multiple total DAIs include a set of total DAIs associated with the UE, wherein each total DAI, in the set of total DAIs, is associated with a different set of component carriers used by the UE for carrier aggregation, as described above in connection with FIG. 10. In some aspects, the set of total DAIs is identified by the UE using a set of hash values, associated with the UE, that hash to a set of fields of the common downlink control communication in which the set of total DAIs are indicated, as described above in connection with FIG. 10.

In some aspects, a first slot in which the common downlink control communication is received is determined based at least in part on a timing relationship between the first slot and a second slot in which the UE is to transmit an uplink control communication. For example, the UE may determine a slot (e.g., X) in which the UE is to transmit an uplink control communication to report HARQ ACK/NACK feedback for the bundling window, and may determine another slot (e.g., X-1) to be monitored by the UE for the common downlink control communication. In some aspects, the timing relationship may be configured using an RRC configuration. In this way, the UE may conserve resources by monitoring for the common downlink control communication only in an appropriate slot.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

In some aspects, to permit signaling of HARQ ACK/NACK feedback for multiple DAI groups, the base station 110 may signal multiple total DAIs, corresponding to the multiple groups, in an uplink grant. In this way, network resources may be conserved by using a single uplink grant to indicate different total DAIs corresponding to different DAI groups of the UE 120, and ACK/NACK ambiguities associated with using multiple DAI groups may be reduced or eliminated.

Additional details are provided below in connection with process 1200 of FIG. 12 and process 1300 of FIG. 13. In some aspects, process 1200 and/or process 1300 may be used when the UE 120 transmits ACK/NACK feedback via a physical uplink shared channel (PUSCH), such as when uplink control information is piggybacked on the PUSCH.

Figure 12:
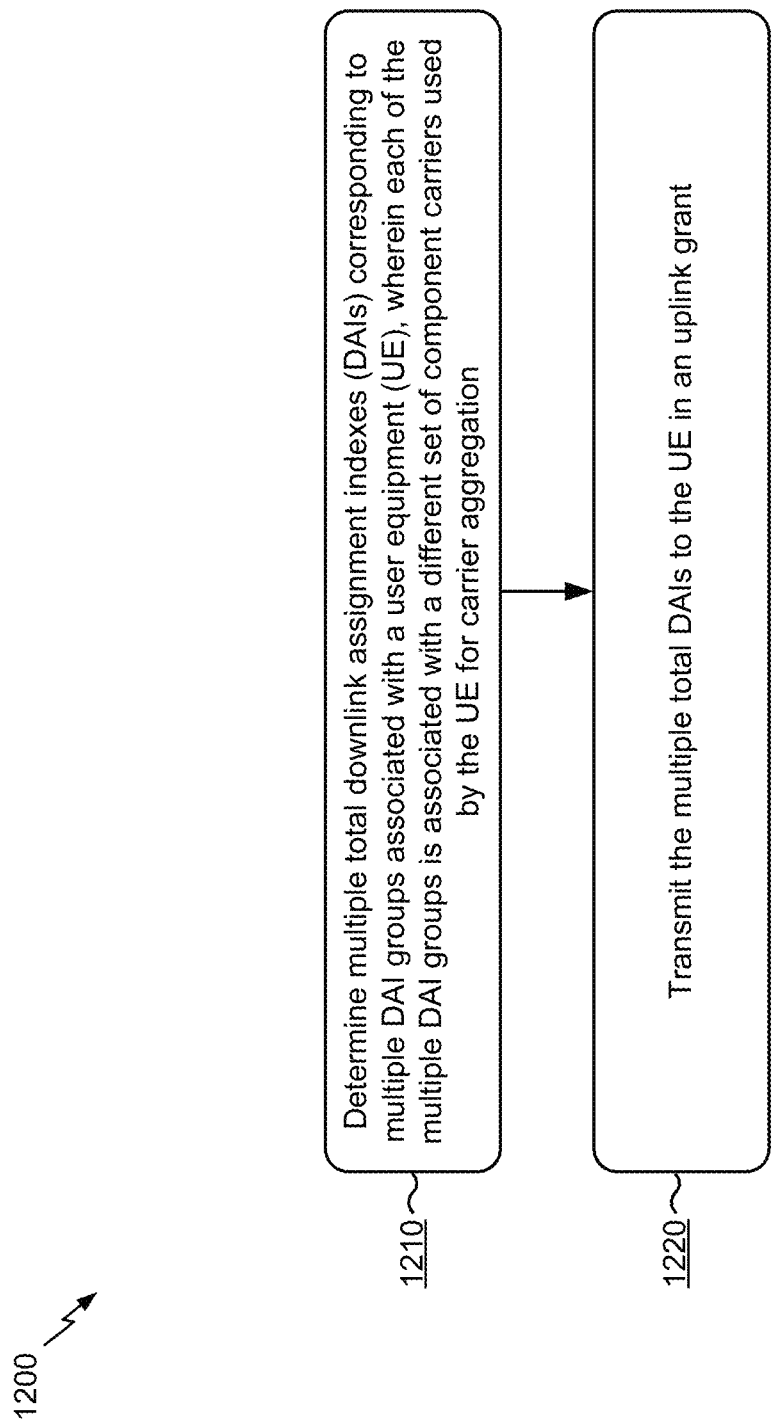

FIG. 12 is a diagram illustrating an example process 1200 performed, for example, by a base station, in accordance with various aspects of the present disclosure. Example process 1200 is an example where a base station (e.g., base station 110 and/or the like) uses DAI in New Radio.

As shown in FIG. 12, in some aspects, process 1200 may include determining multiple total downlink assignment indexes (DAIs) corresponding to multiple DAI groups associated with a user equipment (UE), wherein each of the multiple DAI groups is associated with a different set of component carriers used by the UE for carrier aggregation (block 1210). For example, the base station may determine (e.g., using controller/processor 240 and/or the like) multiple total DAIs corresponding to multiple DAI groups associated with a UE. In some aspects, each DAI group is associated with a different set of component carriers used by the UE for carrier aggregation, as described above in connection with FIG. 4. For example, the base station may determine a first total DAI for a first DAI group of the UE, may determine a second total DAI for a second DAI group of the UE, and/or the like.

As further shown in FIG. 12, in some aspects, process 1200 may include transmitting the multiple total DAIs to the UE in an uplink grant (block 1220). For example, the base station may transmit (e.g., using transmit processor 220, TX MIMO processor 230, MOD 232, antenna 234, and/or the like) the multiple total DAIs to the UE in an uplink grant.

Process 1200 may include additional aspects, such as any single aspect or any combination of aspects described below and/or in connection with one or more other processes described herein.

In some aspects, the multiple total DAIs are indicated in different fields of the uplink grant. In some aspects, the uplink grant may be for an uplink data channel via which uplink control information is piggybacked. For example, the uplink grant may be for the PUSCH. In this way, when the UE is to transmit HARQ ACK/NACK feedback for different DAI groups via the PUSCH, the uplink grant may indicate the total DAIs for the different DAI groups, thereby reducing or eliminating ambiguities between the UE and the base station regarding HARQ ACK/NACK feedback for different DAI groups.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
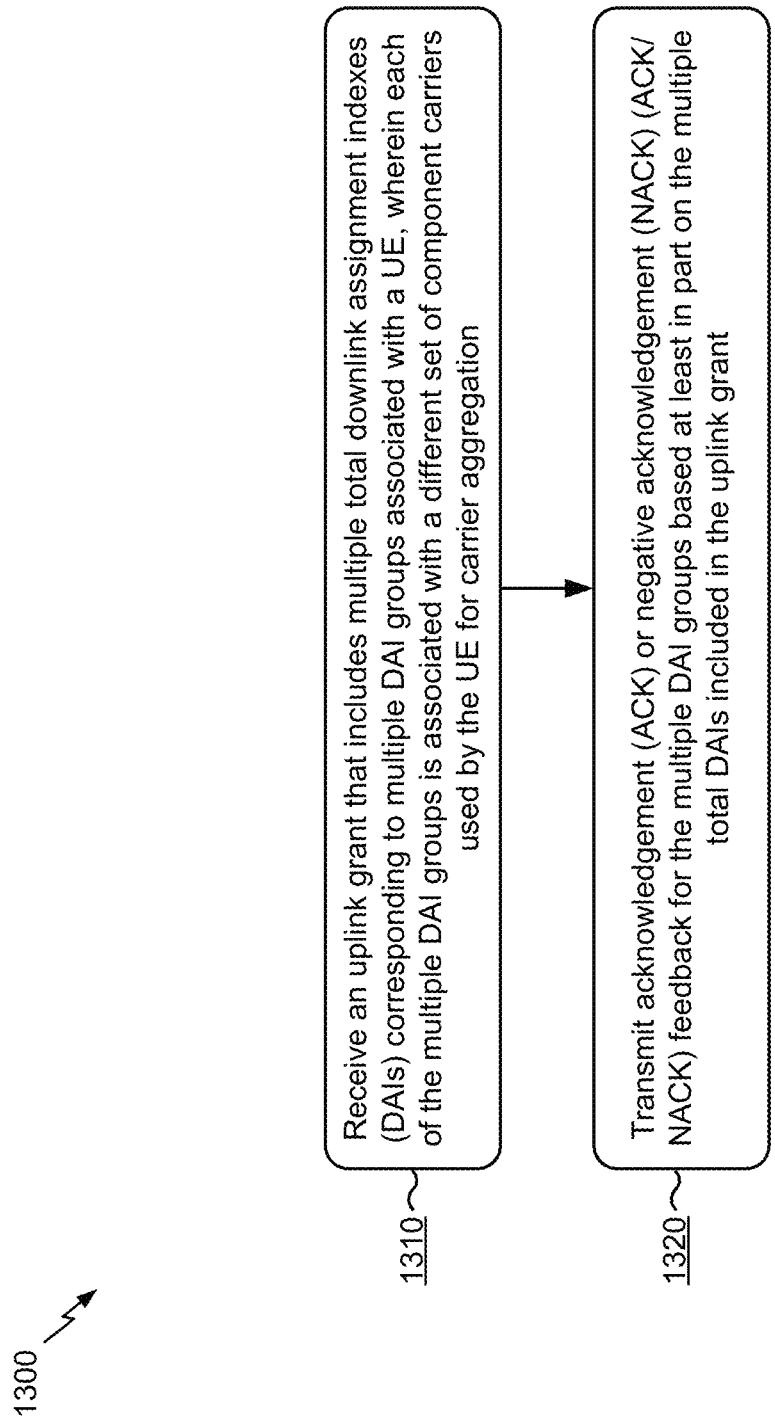

FIG. 13 is a diagram illustrating an example process 1300 performed, for example, by a UE, in accordance with various aspects of the present disclosure. Example process 1300 is an example where a UE (e.g., UE 120 and/or the like) uses DAI in New Radio.

As shown in FIG. 13, in some aspects, process 1300 may include receiving an uplink grant that includes multiple total downlink assignment indexes (DAIs) corresponding to multiple DAI groups associated with the UE, wherein each of the multiple DAI groups is associated with a different set of component carriers used by the UE for carrier aggregation (block 1310). For example, the UE may receive (e.g., using antenna 252, DEMOD 254, MIMO detector 256, receive processor 258, controller/processor 280, and/or the like) an uplink grant that includes multiple total DAIs corresponding to multiple DAI groups associated with the UE. In some aspects, each of the multiple DAI groups is associated with a different set of component carriers used by the UE for carrier aggregation, as described above in connection with FIG. 4.

As further shown in FIG. 13, in some aspects, process 1300 may include transmitting acknowledgement (ACK) or negative acknowledgement (NACK) (ACK/NACK) feedback for the multiple DAI groups based at least in part on the multiple total DAIs included in the uplink grant (block 1320). For example, the UE may transmit (e.g., using controller/processor 280, transmit processor 264, TX MIMO processor 266, MOD 254, antenna 252, and/or the like) ACK/NACK feedback for the multiple DAI groups based at least in part on the multiple total DAIs included in the uplink grant.

Process 1300 may include additional aspects, such as any single aspect or any combination of aspects described below and/or in connection with one or more other processes described herein.

In some aspects, the multiple total DAIs are indicated in different fields of the uplink grant. In some aspects, the uplink grant may be for an uplink data channel via which uplink control information is piggybacked. For example, the uplink grant may be for the PUSCH. In some aspects, the ACK/NACK feedback is transmitted via the uplink data channel (e.g., the PUSCH and/or the like). In this way, when the UE is to transmit HARQ ACK/NACK feedback for different DAI groups via the PUSCH, the uplink grant may indicate the total DAIs for the different DAI groups, thereby reducing or eliminating ambiguities between the UE and the base station regarding HARQ ACK/NACK feedback for different DAI groups.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station, comprising:
   determining multiple total downlink assignment indexes (DAIs) corresponding to multiple DAI groups associated with a user equipment (UE), wherein each of the multiple DAI groups is associated with a different set of component carriers used by the UE for carrier aggregation, wherein the multiple total DAIs include a first total DAI for a first set of component carriers used by the UE and a second total DAI for a second set of component carriers used by the UE, and wherein a different number of code block groups per transport block are used for the first set of component carriers and the second set of component carriers; and transmitting the multiple total DAIs to the UE in an uplink grant.

2. The method of claim 1, wherein the multiple total DAIs are indicated in different fields of the uplink grant.

3. The method of claim 1, wherein the uplink grant is for an uplink data channel via which uplink control information is piggybacked.

4. The method of claim 1, wherein the multiple total DAIs are transmitted based at least in part on a determination that the UE uses a different number of code block groups per transport block for the first set of component carriers and the second set of component carriers.

5. The method of claim 1,
wherein the first set of component carriers comprises one code block group per transport block, and
wherein the second set of component carriers comprises a number of code block groups, per transport block, that is greater than one.

6. The method of claim 1, wherein the uplink grant is for a physical uplink shared channel (PUSCH).

7. The method of claim 1, wherein a number of code block groups per transport block is configured dynamically or semi-statically.

8. The method of claim 1, wherein a number of acknowledgement (ACK) or negative acknowledgement (NACK) (ACK/NACK) bits transmitted for a transport block is equal to a number of code block groups for the transport block.

9. A method of wireless communication performed by a user equipment (UE), comprising:
receiving an uplink grant that includes multiple total downlink assignment indexes (DAIs) corresponding to multiple DAI groups associated with the UE, wherein each of the multiple DAI groups is associated with a different set of component carriers used by the UE for carrier aggregation, wherein the multiple total DAIs include a first total DAI for a first set of component carriers used by the UE and a second total DAI for a second set of component carriers used by the UE, and wherein a different number of code block groups per transport block are used for the first set of component carriers and the second set of component carriers; and
transmitting acknowledgement (ACK) or negative acknowledgement (NACK) (ACK/NACK) feedback for the multiple DAI groups based at least in part on the multiple total DAIs included in the uplink grant.

10. The method of claim 9, wherein the multiple total DAIs are indicated in different fields of the uplink grant.

11. The method of claim 9, wherein the uplink grant is for an uplink data channel via which uplink control information is piggybacked.

12. The method of claim 9, wherein the ACK/NACK feedback is transmitted via an uplink data channel.

13. The method of claim 9,
wherein the first set of component carriers comprises one code block group per transport block, and
wherein the second set of component carriers comprises a number of code block groups, per transport block, that is greater than one.

14. The method of claim 9, wherein the uplink grant is for a physical uplink shared channel (PUSCH).

15. The method of claim 9, wherein a number of code block groups per transport block is configured dynamically or semi-statically.

16. The method of claim 9, wherein a number of ACK/NACK bits transmitted for a transport block is equal to a number of code block groups for the transport block.

17. A base station for wireless communication, comprising:
memory; and
one or more processors operatively coupled to the memory, the memory and the one or more processors configured to:
determine multiple total downlink assignment indexes (DAIs) corresponding to multiple DAI groups associated with a user equipment (UE), wherein each of the multiple DAI groups is associated with a different set of component carriers used by the UE for carrier aggregation, wherein the multiple total DAIs include a first total DAI for a first set of component carriers used by the UE and a second total DAI for a second set of component carriers used by the UE, and wherein a different number of code block groups per transport block are used for the first set of component carriers and the second set of component carriers; and
transmit the multiple total DAIs to the UE in an uplink grant.

18. The base station of claim 17, wherein the multiple total DAIs are indicated in different fields of the uplink grant.

19. The base station of claim 17, wherein the uplink grant is for an uplink data channel via which uplink control information is piggybacked.

20. The base station of claim 17, wherein the multiple total DAIs are transmitted based at least in part on a determination that the UE uses a different number of code block groups per transport block for the first set of component carriers and the second set of component carriers.

21. The base station of claim 17,
wherein the first set of component carriers comprises one code block group per transport block, and
wherein the second set of component carriers comprises a number of code block groups, per transport block, that is greater than one.

22. A user equipment (UE) for wireless communication, comprising:
memory; and
one or more processors operatively coupled to the memory, the memory and the one or more processors configured to:
receive an uplink grant that includes multiple total downlink assignment indexes (DAIs) corresponding to multiple DAI groups associated with the UE, wherein each of the multiple DAI groups is associated with a different set of component carriers used by the UE for carrier aggregation, wherein the multiple total DAIs include a first total DAI for a first set of component carriers used by the UE and a second total DAI for a second set of component carriers used by the UE, and wherein a different number of code block groups per transport block are used for the first set of component carriers and the second set of component carriers; and
transmit acknowledgement (ACK) or negative acknowledgement (NACK) (ACK/NACK) feedback for the multiple DAI groups based at least in part on the multiple total DAIS included in the uplink grant.

23. The UE of claim 22, wherein the multiple total DAIS are indicated in different fields of the uplink grant.

24. The UE of claim 22, wherein the uplink grant is for an uplink data channel via which uplink control information is piggybacked.

25. The UE of claim 22, wherein the ACK/NACK feedback is transmitted via an uplink data channel.

26. The UE of claim 22,
wherein the first set of component carriers comprises one code block group per transport block, and
wherein the second set of component carriers comprises a number of code block groups, per transport block, that is greater than one.

* * * * *